United States Patent
Kulkarni et al.

(10) Patent No.: US 11,863,443 B2
(45) Date of Patent: *Jan. 2, 2024

(54) MULTI-REGION VIRTUAL OVERLAY WIDE AREA NETWORK

(71) Applicant: HEWLETT PACKARD ENTERPRISE DEVELOPMENT LP, Houston, TX (US)

(72) Inventors: Manoj Gopal Kulkarni, Fremont, CA (US); Pawan Kumar Singh, Los Altos, CA (US); Patrick Lee Mahan, Soquel, CA (US); Manoj Kumar Dutta, Dublin, CA (US); Theodore Ernest Tedijanto, Cupertino, CA (US); Damon John Ennis, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/394,266

(22) Filed: Aug. 4, 2021

(65) Prior Publication Data
US 2022/0103471 A1    Mar. 31, 2022

Related U.S. Application Data

(63) Continuation of application No. 17/039,376, filed on Sep. 30, 2020, now Pat. No. 11,546,256.

(51) Int. Cl.
*H04L 43/16*    (2022.01)
*H04L 45/64*    (2022.01)
(Continued)

(52) U.S. Cl.
CPC .......... *H04L 45/64* (2013.01); *H04L 12/2863* (2013.01); *H04L 12/4633* (2013.01);
(Continued)

(58) Field of Classification Search
CPC . H04L 45/64; H04L 12/2863; H04L 12/4633; H04L 12/4641; H04L 29/06149; H04L 61/6004; H04L 61/6068
See application file for complete search history.

(56) References Cited

U.S. PATENT DOCUMENTS

2015/0304382 A1* 10/2015 Michaud ............... H04L 67/146
                                                            709/217
2016/0218947 A1    7/2016 Hughes et al.
(Continued)

FOREIGN PATENT DOCUMENTS

EP    3690649           8/2020
EP    3690649 A1 *      8/2020    ......... H04L 12/2859
EP    3698649 A1        8/2020

OTHER PUBLICATIONS

Extended European Search Report Received for EP Patent Application No. 21154199.0, dated Jun. 28, 2021, 12 pages.

*Primary Examiner* — Lan-Huong Truong

(57) ABSTRACT

Disclosed herein are systems and methods for the creation, management, and utilization of a multi-region virtual overlay wide area network from a plurality of special purpose network appliances. In exemplary embodiments, multiple regions are created for the virtual overlay wide area network, each region having its own network topology. At least one network appliance from each region is in communication with at least one network appliance from each other region, for inter-region connectivity within the virtual overlay wide area network. A subnet sharing protocol can be utilized to exchange routing information among each network appliance within each region, and between each region.

21 Claims, 16 Drawing Sheets

(51) Int. Cl.
  *H04L 12/28* (2006.01)
  *H04L 12/46* (2006.01)
  *H04L 69/168* (2022.01)
  *H04L 101/604* (2022.01)
  *H04L 101/668* (2022.01)

(52) U.S. Cl.
  CPC ........ H04L 12/4641 (2013.01); H04L 69/168 (2013.01); *H04L 2101/604* (2022.05); *H04L 2101/668* (2022.05)

(56) References Cited

U.S. PATENT DOCUMENTS

| | | |
|---|---|---|
| 2018/0227223 A1 | 8/2018 | Hughes |
| 2019/0274070 A1* | 9/2019 | Hughes ............... H04L 47/2441 |
| 2021/0058284 A1* | 2/2021 | Chandramohan ..... H04L 45/586 |
| 2021/0112034 A1* | 4/2021 | Sundararajan ...... H04L 41/0893 |

* cited by examiner

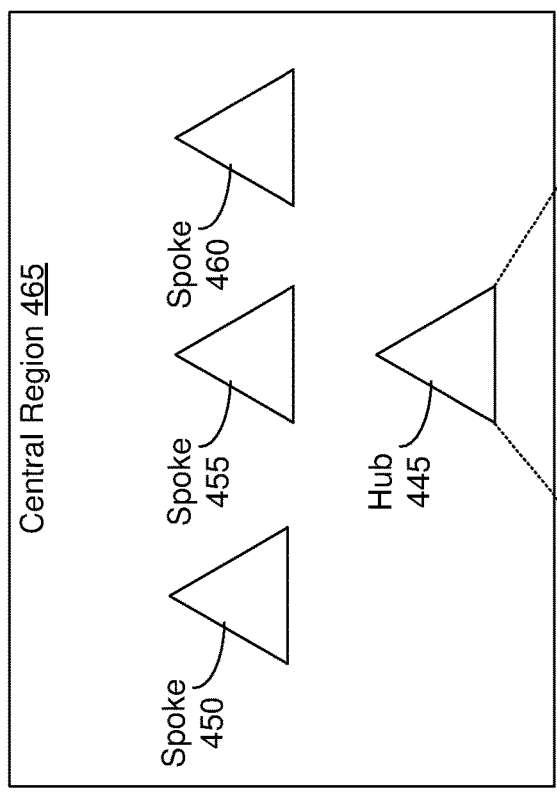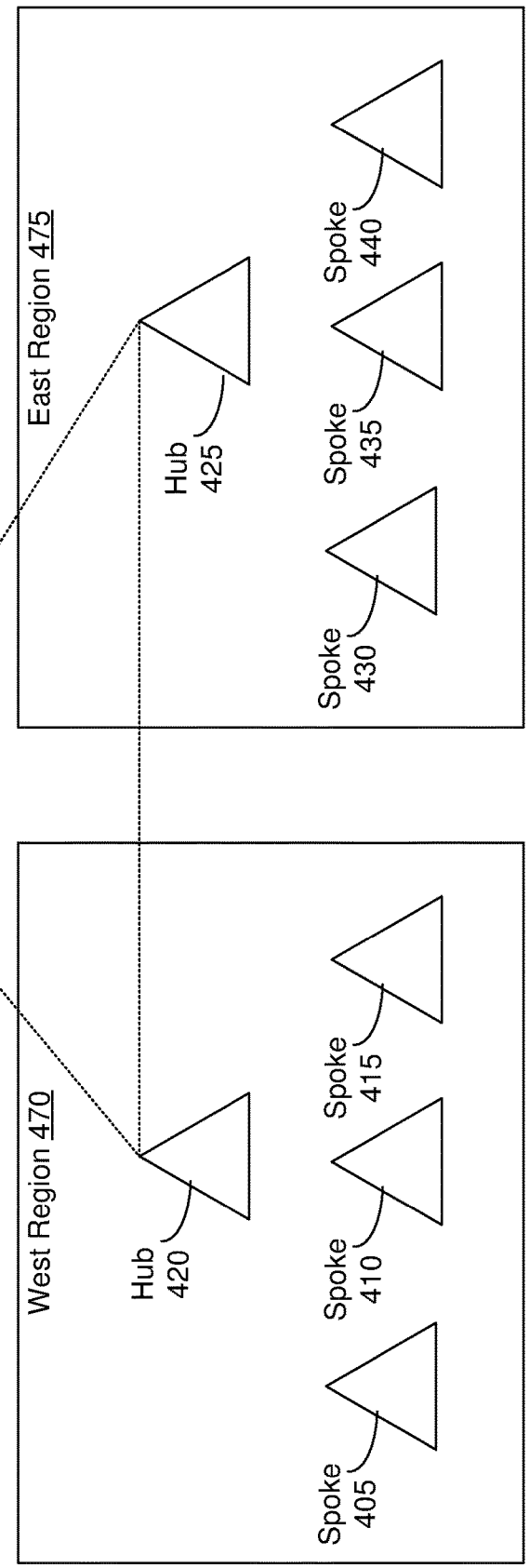
FIG. 4

| REGIONS x | | | |
|---|---|---|---|
| REGIONS ⓘ    EDIT REGIONS    HUBS    EDIT OVERLAYS    ENABLE REGIONAL ROUTING | | | |
| VIEW STATUS | | | |
| | 6 ROWS | | SEARCH [ ] |
| REGION | HOSTNAME | | PRESENT CHANGES |
| EAST ADD ☐ REMOVE ☐ | SPRO2-ECVA | EAST | |
| WEST ☐ ☐ | SPRO2-ECVB | WEST | |
| | SPRO2-ECVC | EAST | |
| | SPRO2-ECVD | WEST | |
| APPLY CANCEL | SPRO2-ECVE | EAST | |
| | SPRO2-ECVF | | |

MULTI-REGION VIRTUAL OVERLAY WIDE AREA NETWORK

CROSS REFERENCE TO RELATED APPLICATIONS

This application is a continuation of, and claims the priority benefit of, U.S. patent application Ser. No. 17/039,376 filed Sep. 30, 2020. The disclosure of the above-referenced application is incorporated herein in its entirety for all purposes.

TECHNICAL FIELD

This disclosure relates generally to the creation and use of a multi-regional virtual overlay Software-Defined Wide Area Network.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Traditional enterprise Wide Area Network (WAN) networks connect branch offices (e.g. retail locations, manufacturing sites), corporate offices (headquarters) and one or more data centers by deploying network appliances at all of the sites. Enterprises primarily use MPLS service delivered by the service providers to connect all the sites. Service providers provision MPLS connectivity by configuring their multitenant MPLS backbone infrastructure. In a large-scale deployment, sites can span across multiple geographical regions requiring enterprises to use MPLS services from multiple regional MPLS service providers. In this scenario, service providers interconnect their MPLS backbones with each other using NNI (Network to Network Interface). This provides a similar experience to mobile phone connectivity where the network provider is automatically changed in an international roaming scenario. As a consumer of MPLS service, enterprises don't have to do any site-to-site network connectivity configuration since it is delivered through paid MPLS service. Complexity of how the sites are connected resides in the service provider MPLS backbone network and is hidden to enterprise networking teams.

Today's enterprise networks include branch offices (e.g. retail locations, manufacturing sites), corporate offices (HQs), one or more data centers and private data centers hosted in the public cloud (e.g. Amazon Web Services, Azure and Google). Enterprise Wide Area Networks are deployed using Software Defined WAN (SD-WAN) technology. The SD-WAN technology is transport agnostic and uses various combinations of transports in addition to MPLS (e.g. one or more Internet links, DIA, 4G/LTE links, etc.)

Internet links, DIA and other transport links are cheaper and unlike MPLS, there is no MPLS backbone network or the service offered to connect all the sites over these links. Instead, all the sites are connected by the SD-WAN building secured tunnels (IPSec tunnels) over various transport links to form a virtual overlay network. Since the transport links are used as raw pipes, the SD-WAN needs be configured to provide different network topologies (e.g., hub and spoke or full mesh). For large scale deployments with global spread, these virtual network topologies can become quite complex and make it hard to manage the network. Typically, enterprise network teams didn't have to deal with this in their traditional MPLS-based Wide Area Network and may find it cumbersome to configure and manage these topologies. The SD-WAN solutions disclosed herein provide mechanisms to build different network topologies and user interface to make it easy to configure and meet business objectives in a large global network.

Certain computing appliances can be utilized to enable an enterprise's SD-WAN (software defined wide area networking) deployment, allowing for zero-touch provisioning, enhanced quality of service, security, and redundancy over any type of network, including basic (public) Internet. In the enterprise, customers have historically leased lines from network providers (MPLS is an example of a type of leased line). This means that the provider provisions and configures the network from end-to-end, and the user pays a high price in order to have what is essentially a private network. This also puts them at the mercy of the provider during outages, and gives them little recourse when the provided service is misbehaving, or requires changes to configuration.

By providing systems and methods to free an enterprise from these limitations of MPLS, and expressly enabling enterprise computers to use basic Internet or other methods of communicating between their offices, provides the enterprise with a low-cost alternative to MPLS, or redundancy alongside MPLS. Further, a computing appliance can also function in certain deployments as a replacement for a typical edge-router, by providing the same support for all protocols and applications across any network. In this way, an end-user customer would have to make no special accommodations, and would not need to know nor care whether the underlying traffic was running over MPLS or Internet or other type of network.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In various embodiments of the present disclosure, a system for creating a multi-region virtual overlay network for a software-defined wide area network is disclosed. The system may comprise: a plurality of network appliances, each appliance of the plurality of network appliances having a plurality of network interfaces for transmitting and receiving data over at least two communication networks; and an orchestrator device in communication with each of the plurality of network appliances, wherein the orchestrator device is configured to: process information regarding configuration of each network appliance of the plurality of network appliances; assign each network appliance to one region from a plurality of regions in the virtual overlay network, creating at least two regional subnetworks on the virtual overlay network; assign each appliance within a regional subnetwork to a role for its region, creating a network topology for the region; create a first plurality of virtual tunnels on the virtual overlay network for each region, each of the first plurality of tunnels connecting each appliance within a region to at least one other appliance in the same region, in accordance with the network topology for the region; and create a second plurality of virtual tunnels on the virtual overlay network to connect at least one appliance within each region to at least one appliance in each other region, for inter-region connectivity.

Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

FIG. 4 depicts an example network topology with three regions in a Software Defined Wide Area Network (SD-WAN).

FIGS. 13-17 depict exemplary user interfaces that a network administrator may view from an orchestrator.

DETAILED DESCRIPTION

Figure 1:
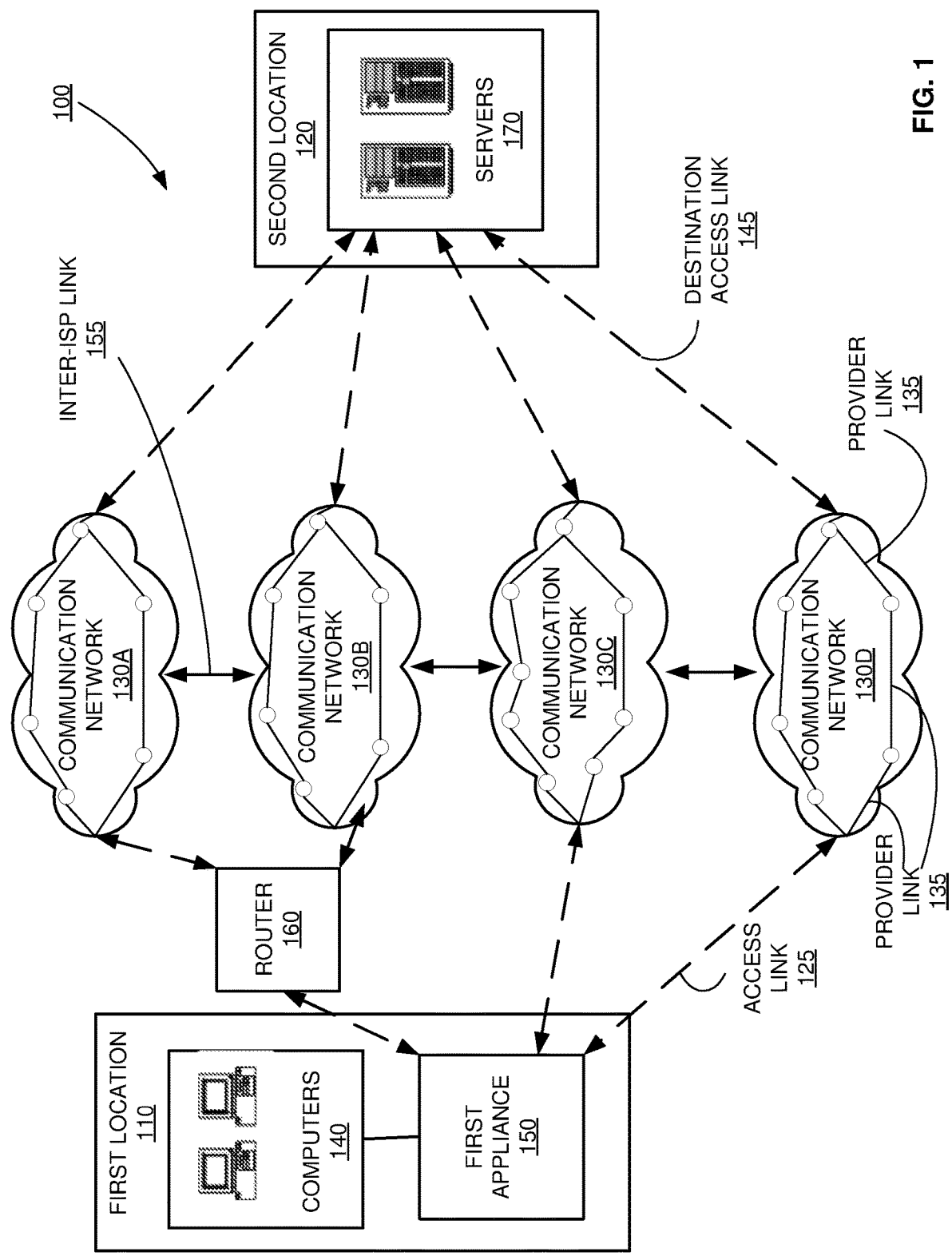
FIG. 1 illustrates an exemplary system within which the present disclosure can be implemented.

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system containing one or more computers, or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to mechanisms for providing regional network configurations of a virtual overlay Software-Defined Wide Area Network (SD-WAN). Embodiments of the present disclosure provide a unique solution to help enterprises build large scale SD-WAN. This is accomplished by allowing division of a large SD-WAN into regions, each region being a subnetwork of enterprise sites deployed with a specially programmed network computing appliance. Each network appliance at a site belongs to one and only one region. Thus, a Software-Defined Wide Area Network of the present disclosure is composed of multiple interconnected regional subnetworks.

In embodiments of the present disclosure, SD-WAN can be utilized to seamlessly meld together private and public communication networks, so that the SD-WAN provider can carry network traffic over the Internet without the use of any ISPs. Public communication networks today typically create point to point links, to stitch together a network manually over IPSec to make it seem like a private network to an end user. With the use of an SD-WAN fabric, each individual router and network does not need to be manually configured to carry network traffic. Rather, an end user simply transmits to an edge router of the SD-WAN fabric and does not need to worry about the intermediate hops to the destination computer. In this way, a source can transmit traffic over a public Internet (and not have to rely on an expensive ISP connection) in a scalable, secure, seamless, and deployment free manner. Destination sites can be added or removed to the SD-WAN fabric, without any change necessary from the source side or the destination side of the network traffic.

With the specialized SD-WAN fabric created by the present invention, an entire proprietary SD-WAN fabric may appear as a single neighboring router to a peer computing device outside of the SD-WAN.

Embodiments of the present disclosure can be implemented via a physical or virtual network appliance with at least two standard interfaces (vLAN or Native) on different subnetworks. The interfaces can be LAN or WAN interfaces. The network appliance can be configured in a number of different ways.

Depending upon the network topology configuration, each network appliance in a region builds either a full mesh, partial mesh or hub and spoke topology with all the other appliances in a region. Each network appliance can play a specific role in the SD-WAN, depending on the topology of the region. For example, in the case of a regional network with hub and spoke topology, each appliance in the region is configured as either a hub or a spoke for the region. The hub network appliances provide an intermediate network hop to connect two different spokes in the same region (intra-region).

Inter-region connectivity is also provided by embodiments of the present disclosure. With inter-region connectivity, a hub in one region is connected to a hub in another region. This forms a second level of hub-to-hub network topology (inter-region network topology). For a site connecting from one region to another region, an exemplary SD-WAN path may be: source node→regional hub→hub of the other region→destination node.

In embodiments of the present disclosure, regions of an enterprise SD-WAN are configured by the enterprise itself, and are thus customizable. An enterprise may have hundreds or thousands of offices spread across a globe. In a typical network architecture, these sites are connected to one another via MPLS and the enterprise must configure rules about how each site connects with each other. With the present invention, regions are created within an SD-WAN, and a special purpose computing network appliance belongs to a specific region, creating a logical topology. Hubs operate as interconnect points across regions.

Further, forming a virtual network across thousands of sites and forming a full mesh architecture between them is very costly and requires building millions of tunnels to facilitate communications. With the regional SD-WAN architecture disclosed herein, the network burden is reduced. Only hubs of each region need to be fully meshed, significantly reducing a number of tunnels required in the virtual overlay network.

With an SD-WAN, data transport is virtualized, including Internet links, LTE, etc. Once the virtual network is created, it serves as a raw network. Embodiments of the present disclosure provide for the creation of user defined topologies on the virtual network. Previously this was only done on an MPLS network. In the present disclosure, MPLS serves as a raw data transfer pipe for an SD-WAN, whereas the virtual network provides intelligence for the data transfer.

By dividing the communication network into regions, an enterprise can define applicable business policies region by region. For example, an enterprise may have a business policy that traffic traversing over the Internet in one region is sent to Zscaler cloud security service, while traffic traversing in a second region is sent to a local cloud security service provider (e.g., Symantec) for that second region. In this way, business policies for an enterprise can be customized on a regional basis.

Further, each region of the SD-WAN can have different combinations of transport links with different link qualities and link bandwidths. Regional network architecture allows enterprises to configure link usage region by region. For example, one region can use MPLS links to carry specific application traffic while for the same application, Internet links can be used in the other regions.

Similar to a single region (i.e. no region) SD-WAN, the multi-region SD-WAN disclosed herein is centrally orchestrated from a single orchestrator. The orchestrator translates user policies into network configuration policies, assigns hub and spoke roles to each appropriate appliance, and pushes corresponding network polices to all of the appliances in the network. This allows a network administrator to configure regional policies and global network wide policies to meet regional and corporate business goals.

In some embodiments, local configuration aspects of the region can be restricted to be managed by regional network administrative teams, while the global aspects on the configuration can be managed by global network administrative teams. Global policies like application to BIO mappings, VRFs (network wide layer-3 segmentation) and end to end security policies are required for the entire network. In the regional network architecture, the global policies are honored by packets carrying sufficient information for inter-region traffic flows.

I. System Setup

FIG. 1 illustrates an exemplary system 100, within which the present disclosure can be implemented. The exemplary system 100 includes a first location 110, a second location 120, and communication networks 130A-130D. While four communication networks are depicted in exemplary system 100, there can be any number of communication networks, including just one. Additionally, system 100 can include many locations, though only two are depicted in the exemplary figure for simplicity.

In the exemplary embodiment depicted in FIG. 1, the first location 110 includes computers 140 and a first appliance 150. In the first location 110, the computers 140 are linked to the first appliance 150. While only one appliance is depicted in first location 110, there can be multiple appliances, physical and/or virtual, at first location 110. In some embodiments, the first location is a branch location of an enterprise. While not depicted here, first location 110 can also comprise additional elements such as routers, switches, or any other physical or virtual computing equipment.

Computers 140 may be any type of computing device capable of accessing a communication network, such as a desktop computer, laptop computer, server, mobile phone, tablet, or any other "smart" device configurable for connection to a communication network.

The first appliance 150 comprises hardware and/or software elements configured to receive data and optionally perform any type of processing before transmitting data across one or more communication networks. As illustrated, the first appliance 150 is configured in-line (or serially) between the computers 140 and the router 160. The first appliance 150 intercepts network traffic between the computers 140 and the servers 170, in either direction.

In other embodiments, the first appliance 150 can be configured as an additional router, gateway, bridge, or be transparent on some or all interfaces. As a router, for example, the first appliance 150 appears to the computers 140 as an extra hop before the router 160. In some embodiments, the first appliance 150 provides redundant routing or peer routing with the router 160. Additionally, the first appliance 150 may provide failure mechanisms, such as, fail-to-open (e.g., no data access) or fail-to-wire (e.g., a direct connection to the router 160). If an appliance has multiple interfaces, it can be transparent on some interfaces, or act like a router, or act like a bridge on others. Alternatively, the appliance can be transparent on all interfaces, or appear as a router or bridge on all interfaces.

In FIG. 1, the first appliance 150 is linked to a router 160, which is coupled to communication networks 130A and 130B. While only one router 160 is depicted in exemplary system 100, there can be multiple routers, switches, or other equipment (physical or virtual) present in system 100, either within the first location 110 or outside of the first location 110. Typically, router 160 would be located within first location 110. In various embodiments, first appliance 150 may be in communication with communication networks 130C and 130D directly (on separate interfaces), instead of through router 160. While router 160 is depicted as being connected to two communication networks and first appliance 150 is also depicted as being connected to two communication networks, a person of ordinary skill in the art would understand that there can be any number of communication networks (including just one communication network) connected to the first location 110, either via router 160, via first appliance 150, or via another computing device. To illustrate that each of the access links is possible but not required in every embodiment, the access links 125 are shown as dashed lines in FIG. 1.

The second location 120 in exemplary system 100 includes servers 170. While the term "server" is used herein, any type of computing device may be used in second location 120, as understood by a person of ordinary skill in the art. The server may also be a virtual machine. While not depicted in FIG. 1, second location 120 can optionally include at least one second appliance in addition to, or instead of, servers 170. Second location 120 can also include other components not depicted in FIG. 1, such as routers, switches, load-balancers or any other physical or virtual computing equipment. In some embodiments, the second location 120 is a central location or data center for an enterprise. In other embodiments, the second location 120 is a data center hosting a public web service or application.

The servers 170 are depicted in FIG. 1 as being linked to the communication networks 130A-130D via destination access links 145. In some embodiments, servers 170 may actually be in communication with the one or more of the communication networks through a router, switch, second appliance, or other physical or virtual equipment. Further, while four destination access links 145 are depicted in FIG. 1, for four communication networks (130A-130D), there may actually be fewer (such as just one) or more communication networks connected to second location 120. To illustrate that each of the destination access links 145 is possible but not required in every embodiment, the destination access links 145 are shown as dashed lines in FIG. 1.

The communication networks 130A-130D comprise hardware and/or software elements that enable the exchange of information (e.g., voice, video and data) between the first location 110 and the second location 120. Some examples of the communication networks 130A-130D are a private wide-area network (WAN), the public Internet, Multiprotocol Label Switching (MPLS) network, and wireless LTE network. Typically, connections from the first location 110 to the communication networks 130A-130D (e.g., from router 160 and first appliance 150) are T1 lines (1.544 Mbps), or broadband connections such as digital subscriber lines (DSL) and cable modems. Other examples are MPLS lines, T3 lines (43.232 Mbps), OC3 (155 Mbps), OC48 (2.5 Gbps), fiber optic cables, or LTE wireless access connection. In various embodiments, each of the communication networks 130A-130D may be connected to at least one other communication network via at least one Inter-ISP link 155. For example, communication network 130A may be connected to communication network 130B, 130C, and/or 130D via one or more inter-ISP links. Data may traverse more than one communications network along a path from first location 110 to second location 120. For example, traffic may flow from the first location 110 to communication network 130A, over inter-ISP link 155 to communication network 130B, and then to the second location 120.

The router 160 and first appliance 150 are optionally connected to the communication networks 130A-130D via access links 125, sometimes also referred to herein as network access links. The communication networks 130A-130D consist of routers, switches, and other internal components that make up provider links 135. The provider links 135 are managed by the network service providers such as an Internet Service Provider (ISP). The second location 120 can be connected to communication networks 130A-130D via destination access links 145. Access links 125, provider links 135, and destination access links 145 can be combined to make various network paths along which data travels between the first location 110 and the second location 120. The exemplary embodiment of FIG. 1 depicts two paths along various provider links 135 through each communication network. However, as understood by persons of ordinary skill in the art, there can be any number of network paths across one or more communication networks.

In addition, communication networks may be in communication with one another via inter-ISP link(s) 155. For example, data traveling through communication network 130A may also travel through communication network 130C before reaching second location 120. In various embodiments, data can travel through any one or more of the communication networks 130A-130D from first location 110 to second location 120, and vice versa. Generally, an inter-ISP link connects communication networks of different internet service providers, such as a link connecting Verizon LTE wireless network with Comcast broadband network. In some embodiments, an inter-ISP link can connect communication networks from the same internet service provider, such as a link connecting Verizon LTE wireless network with the Verizon Fire network.

The first appliance 150, along with any other appliances in system 100 can be physical or virtual. In the exemplary embodiment of a virtual appliance, it can be in a virtual private cloud (VPC), managed by a cloud service provider, such as Amazon Web Services, or others. An appliance in a customer data center can be physical or virtual. Similarly, the second location 120 may be a cloud service such as Amazon Web Service, Salesforce, or others.

As discussed herein, the communication networks 130A-130D can comprise multiple provider links, made up of routers and switches, connecting networked devices in different locations. These provider links, which together form various paths, are part of one or more core networks, sometimes referred to as an underlay network. In addition to these paths, there can also be tunnels connecting two networked devices. A virtual network, sometimes called an overlay network, can be used to transmit data across an underlay network, regardless of which Service Provider manages the routes or provider links. Data from connected devices can travel over this overlay network, which can consist of any number of tunnels or paths between each location.

In an exemplary embodiment, data from computers 140 at first location 110 may include voice, video, and data. This information can be transmitted by first appliance 150 over one or more communication networks 130A-130D to second location 120. In some embodiments, voice, video, and data may be received and transmitted on separate LAN or vLAN interfaces, and first appliance 150 can distinguish the traffic based on the LAN/vLAN interface at which the data was received.

In some embodiments, the system 100 includes one or more secure tunnels between the first appliance 150 and servers 170, or optionally a second appliance at the second location. The secure tunnel may be utilized with encryption (e.g., IPsec), access control lists (ACLs), compression (such as header and payload compression), fragmentation/coalescing optimizations, and/or error detection and correction provided by an appliance.

In various embodiments, first location 110 and/or second location 120 can be a branch location, central location, private cloud network, data center, or any other type of location. In addition, multiple locations can be in communication with each other. As understood by persons of ordinary skill in the art, any type of network topology may be used.

The principles discussed herein are equally applicable to multiple first locations (not shown) and to multiple second locations (not shown). For example, the system 100 may include multiple branch locations and/or multiple central locations coupled to one or more communication networks. System 100 may also include many sites (first locations) in communication with many different public web services (second locations). Branch location/branch location communication, central location/central location communication, central location/cloud appliance communication, as well as multi-appliance and/or multi-node communication and bi-directional communication are further within the scope of the disclosure. However, for the sake of simplicity, FIG. 1 illustrates the system 100 having a single first location 110 and a single second location 120.

Figure 2:
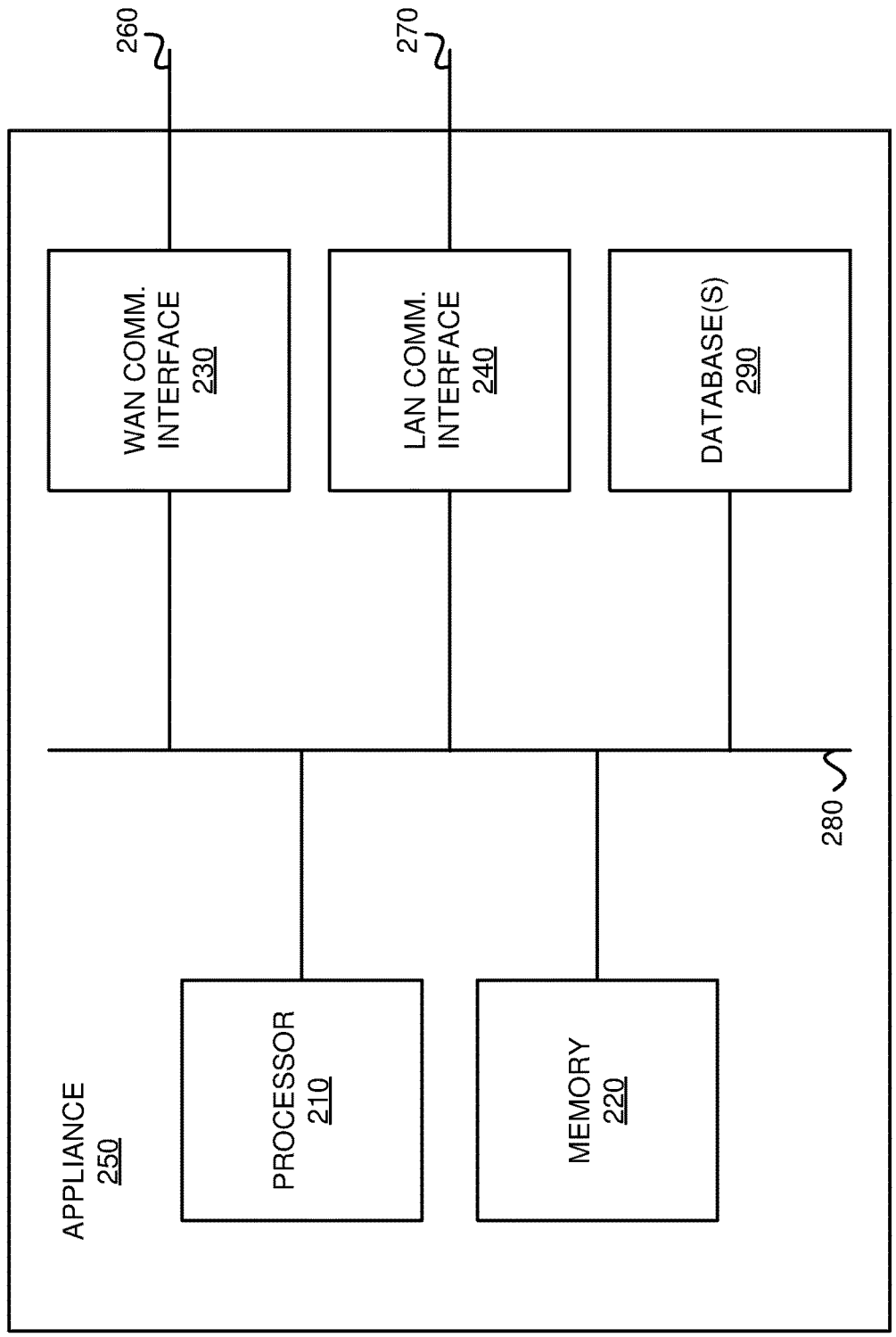
FIG. 2 illustrates a block diagram of an exemplary appliance.

FIG. 2 illustrates a block diagram of an appliance 250 (also referred to herein as a network appliance), in an exemplary implementation of the invention. Appliance 250 may be similar to appliance 220 of FIG. 2 and first appliance 150 of FIG. 1, as discussed herein. Each appliance is at a "site", which may be a branch, a data center, or a virtual instance in a cloud.

The appliance 250 includes a processor 210, a memory 220, a WAN communication interface 230, a LAN communication interface 240, and database(s) 290. A system bus 280 links the processor 210, the memory 220, the WAN communication interface 230, the LAN communication interface 240, and the database(s) 290. When deployed in a branch location, line 260 links the WAN communication interface 230 to the router 160 (in FIG. 1), and line 270 links the LAN communication interface 240 to the computers 140 in FIG. 1.

The database(s) 290 comprises hardware and/or software elements configured to store data in an organized format to allow the processor 210 to create, modify, and retrieve the data. The hardware and/or software elements of the database (s) 290 may include storage devices, such as RAM, hard drives, optical drives, flash memory, and magnetic tape.

In some embodiments, some appliances comprise identical hardware and/or software elements. Alternatively, in other embodiments, some appliances, such as a second appliance, may include hardware and/or software elements providing additional or specialized processing, communication, and storage capacity.

Embodiments of the present invention also allow for centrally assigned policies to be implemented throughout an organization's entire network, to secure and control all WAN traffic for the organization. Software defined WAN (SD-WAN) overlay networks can be created independently from the physical network, and from each other, and in multiple layers. Topology, security, and forwarding rules can be specified independently for each overlay. This design allows for high-scale and secure application segmentation. Each overlay scales automatically as endpoints are added to the SD-WAN fabric, and configuration integrity is maintained as each site maps a local profile into a global overlay.

Figure 3:
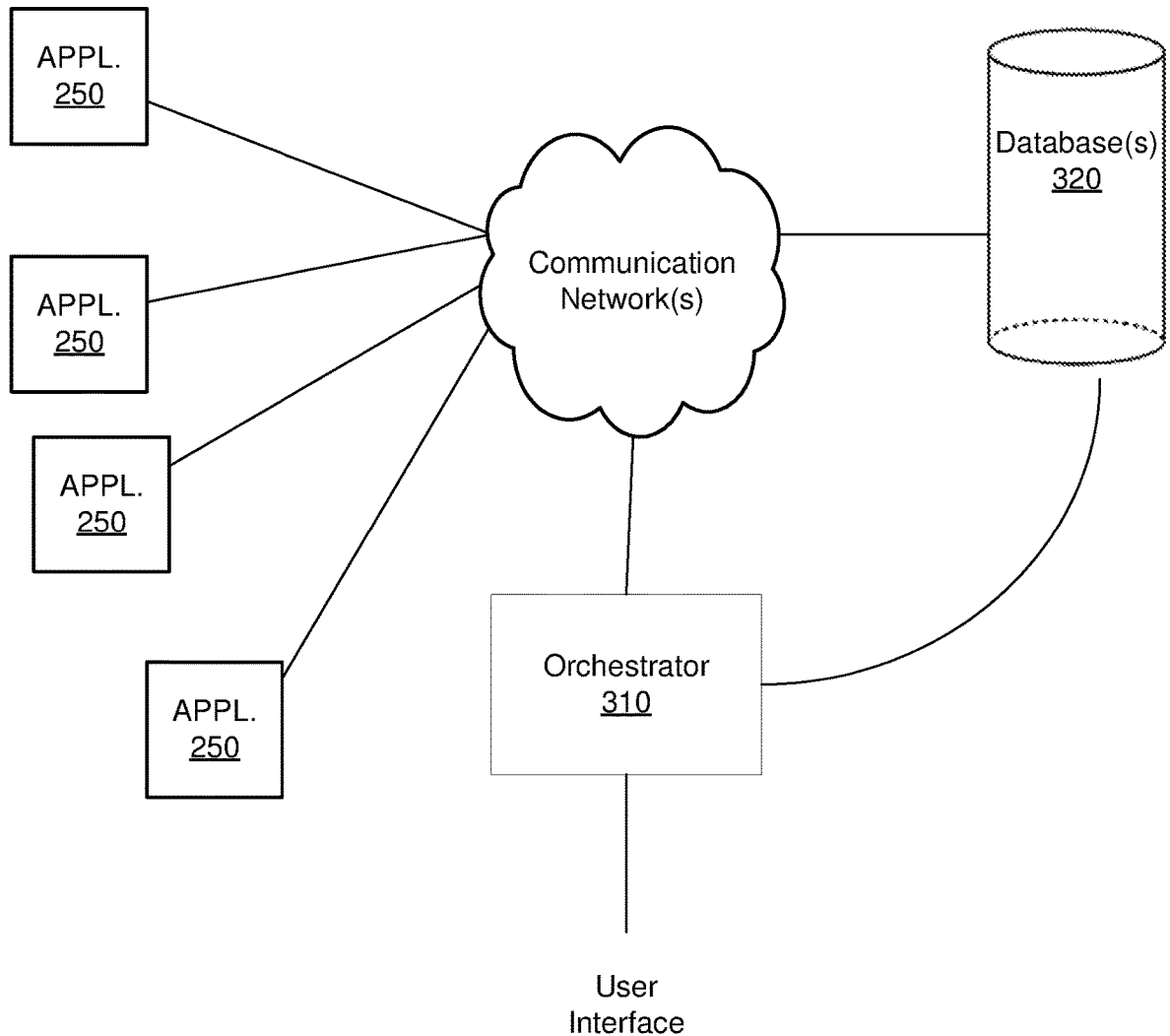
FIG. 3 illustrates an exemplary environment for network appliances.

All of the overlay networks, labels, and corresponding ports, subnets and vLANs can be maintained in one or more databases in communication with an orchestrator device, as depicted in FIG. 3. The orchestrator 310 can be hardware and/or software, and be in communication with each of the networked devices, such as the network appliances, as well as in communication with the database(s) 320.

In exemplary embodiments, the orchestrator 310 may maintain information regarding the configuration of each appliance at each location (physical or virtual). In this way, the orchestrator 310 can create, manage and implement policies for network traffic throughout the network of connected appliances. For example, if a higher priority is designated for voice traffic, the orchestrator 310 can automatically configure the corresponding network appliances at all relevant locations accordingly.

By having knowledge of the configuration of each appliance in the network, the orchestrator 310 can also create and manage tunnels in the enterprise network, including tunnels to carry a particular type of network traffic between each source-destination appliance pair. The orchestrator 310 can automatically configure the enterprise network by determining which tunnels need to be set up, and automatically creating them based on the network nodes and overlays. The orchestrator 310 can also configure policies based on the application classification techniques to preferentially steer certain types of applications over one path rather than over another path.

In exemplary embodiments, network interfaces of a network appliance 250 can be designated on the WAN side and LAN side as processing a specific type of traffic, or traffic from specific applications. For example, a first WAN interface may connect to the public Internet, while a second WAN interface connects to an MPLS service. Both WAN interfaces can support encryption and the Internet uplink can be configured for Network Address Translation (NAT).

II. Regional Overlay Networks

FIG. 4 depicts an example network topology with three regions in a Software Defined Wide Area Network (SD-WAN). While three regions are depicted in the exemplary figure, there may be any number of regions in a single SD-WAN in various deployments.

Regardless of the number of regions, the entire SD-WAN may be hidden and encapsulated into a single virtual interface to a computing device outside of the overlay network. In this way, a computing device outside of the overlay network created by the appliances can exchange messages with an appliance and create a state with an appliance of the overlay network without needing to know or understand the complex overlay network connecting the appliances. While not expressly depicted for simplicity, there can be any number of other routers or other computers in the environment than those shown in FIG. 4.

In the exemplary FIG. 4, West Region 470 has four appliances: one appliance is configured as a hub 420 for the region, and three appliances are configured as spokes for the region (spoke 405, spoke 410, and spoke 415). Exemplary FIG. 4 also depicts East Region 475 with four appliances. One appliance is configured as hub 425 for the region, and three appliances are configured as spokes for the region—spoke 430, spoke 435, and spoke 440. There is also Central Region 465 depicted in exemplary FIG. 4. One appliance is configured as a hub for the region—hub 445. Three appliances are configured as spokes for the region—spoke 450, spoke 455, and spoke 460. While four appliances are depicted in each of these three regions for simplicity, there can be any number of appliances present in each region. However, each region has at least one hub in exemplary FIG. 4, since each region is configured in a hub and spoke topological configuration.

Each of the appliances may be part of a centralized data center or a branch center. Each appliance may or may not have a private network connection as well. Further, each appliance may be connected to an orchestrator (such as orchestrator 310 of FIG. 3), even though not depicted in the exemplary environment of FIG. 4. As discussed herein, the orchestrator has a global view of the whole network across the geographical area, and all of the configurations and deployment can occur at the orchestrator itself. Further, the orchestrator configures the network, such as an exemplary network of FIG. 4.

In order to transmit data, first a secure interface channel is created between the different appliances (also referred to herein as an overlay network). A virtual interface is overlaid on the overlay network. In this way, data can be transmitted in a secure manner regardless of the security of the underlying physical network.

As discussed herein, a central orchestrator for the SD-WAN can configure each network appliance in each region to act as either a hub for the region or a spoke for the region. The orchestrator can automatically update and reassign appliances to each of these roles in a dynamic fashion. For example, if an appliance configured as a hub in a first region goes down for any reason, a spoke in the region can be reconfigured to take over as a hub for the region. In other embodiments, a hub in a second region can be reconfigured to serve as a hub for the first region. Alternatively, a local or global human network administrator can update and reassign appliances to each of these roles in a dynamic fashion.

Network traffic may traverse between each appliance in a region (intra-region), and/or traverse in an inter-region fashion via the hubs. That is, each hub in a region is capable of communicating with each hub in a different region, as depicted in exemplary FIG. 4. For example, an exemplary network path for data flow can be: spoke 405→hub 420→hub 445→spoke 460. Another exemplary network path for data flow can be: spoke 450→hub 445→hub 420→spoke 430.

Figure 5:
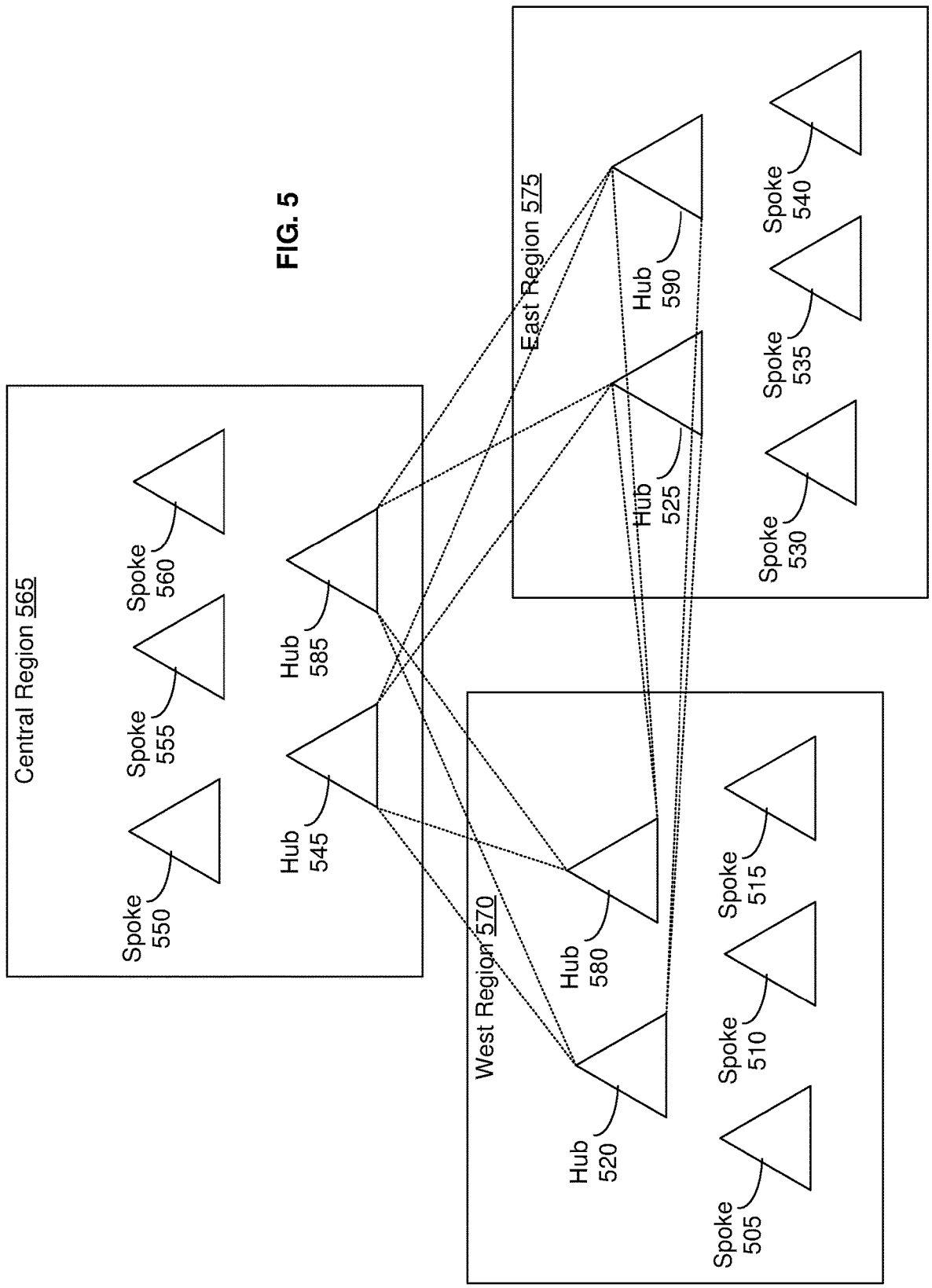
FIG. 5 depicts another example network topology with three regions in a SD-WAN.

FIG. 5 depicts another example network topology with three regions in a SD-WAN. While three regions are depicted in the exemplary figure, there may be any number of regions in a single SD-WAN.

In the exemplary FIG. 5, West Region 570 has five appliances. Two appliances are configured as hubs for the region (hub 520 and hub 580), and three appliances are configured as spokes for the region (spoke 505, spoke 510, and spoke 515). Exemplary FIG. 5 also depicts East Region 575 with five appliances. Two appliances are configured as hubs for the region (hub 525 and hub 590), and three appliances are configured as spokes for the region—spoke 530, spoke 535, and spoke 540. There is also Central Region 565 depicted in exemplary FIG. 5. Two appliances are configured as a hub for the region (hub 545 and hub 585). Three appliances are configured as spokes for the region—spoke 550, spoke 555, and spoke 560. While five appliances are depicted in each of these three regions for simplicity, there can be any number of appliances present in each region. However, each region has at least one hub since each region is configured as a hub and spoke topology. Typically, a hub is a point of failure for a region, which may make it desirable to have two hubs in a region. If one hub fails, the other is still available for connectivity to the region.

As discussed herein, a central orchestrator for the SD-WAN can configure each network appliance in each region to act as either a hub for the region or a spoke for the region. The orchestrator can update and reassign appliances to each of these roles in a dynamic fashion. Alternatively, a local or global human network administrator can update and reassign appliances to each of these roles in a dynamic fashion.

Network traffic may traverse between each appliance in a region (intra-region), and/or traverse in an inter-region fashion via the hubs. That is, each hub in a region is capable of communicating with each hub in a different region, as depicted in exemplary FIG. 5. Thus, hub 525 in East Region 575 is capable of communicating with either hub in West Region 570 and either hub in Central Region 565. As such, hub 525 is connected to four other hubs in the exemplary environment of FIG. 5. Similarly, each of the hubs in FIG. 5 are connected to four other hubs. Notably, a hub in one region may typically not communicate with another hub in its same region, to prevent routing loops.

An exemplary network path for data flow in this environment can be: spoke 505→hub 520→hub 525→spoke 530. Another exemplary network path for data flow can be: spoke 510→hub 580→hub 590→spoke 530.

Figure 6:
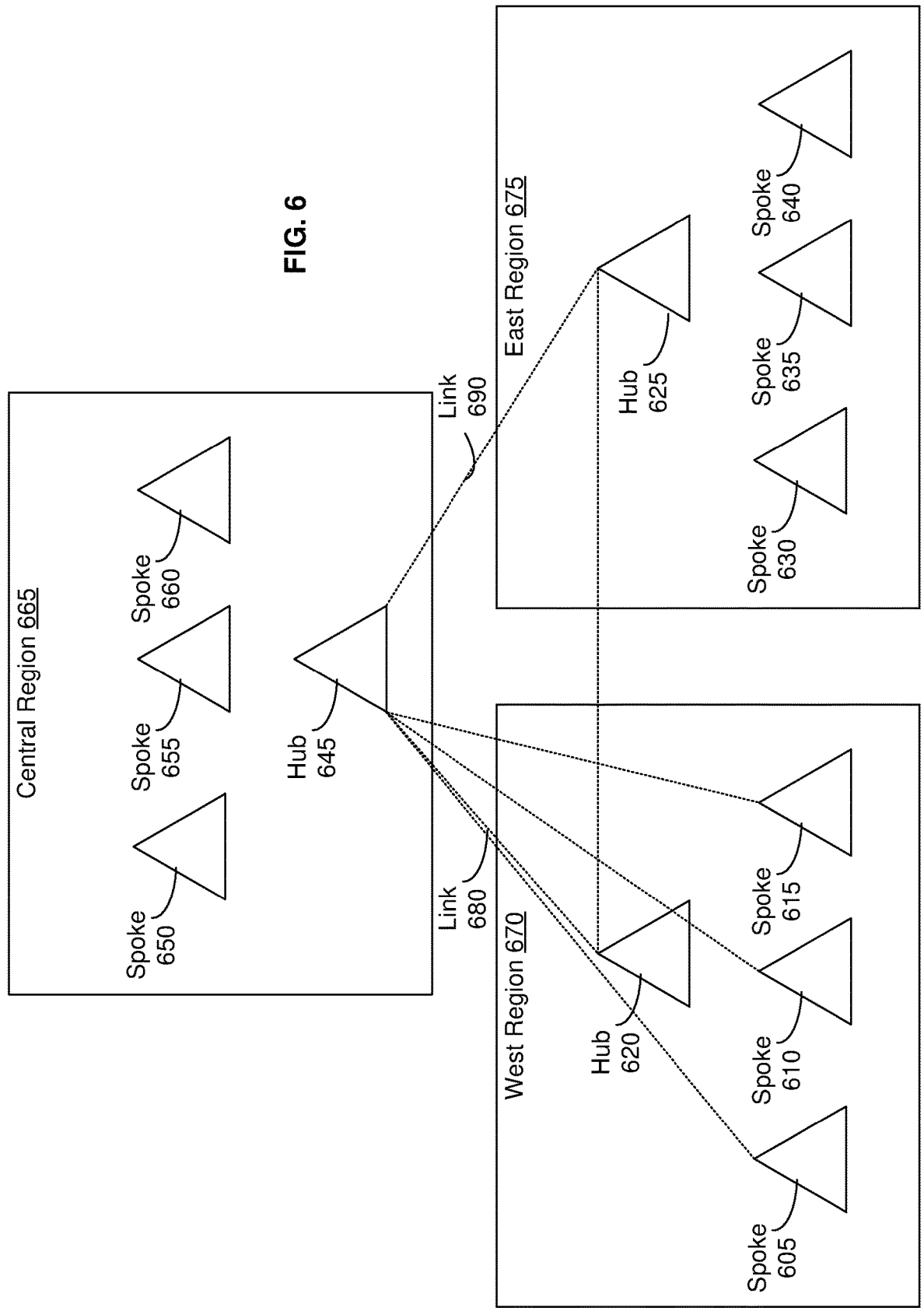
FIG. 6 depicts another example network topology with three regions in a SD-WAN.

FIG. 6 depicts another example network topology with three regions in a SD-WAN. While three regions are depicted in the exemplary figure, there may be any number of regions in a single SD-WAN.

In the exemplary FIG. 6, West Region 670 has four appliances: one appliance is configured as a hub 620 for the region, and three appliances are configured as spokes for the region (spoke 605, spoke 610, and spoke 615). Exemplary FIG. 6 also depicts East Region 675 with four appliances. One appliance is configured as hub 625 for the region, and three appliances are configured as spokes for the region—spoke 630, spoke 635, and spoke 640. There is also Central Region 665 depicted in exemplary FIG. 6. One appliance is configured as a hub for the region—hub 645. Three appliances are configured as spokes for the region—spoke 650, spoke 655, and spoke 660. While four appliances are depicted in each of these three regions for simplicity, there can be any number of appliances present in each region. However, each region has at least one hub since each region is configured in a hub and spoke topology.

As discussed herein, a central orchestrator for the SD-WAN can configure each network appliance in each region to act as either a hub for the region or a spoke for the region. The orchestrator can update and reassign appliances to each of these roles in a dynamic fashion. Alternatively, a local or global human network administrator can update and reassign appliances to each of these roles in a dynamic fashion.

The network of FIG. 6 is configured to provide one hop access to spokes in another region. Also, hub nodes are in a full mesh configuration. For example, the figure depicts hub 645 of Central Region 665 in communication with hub 620 of West Region 670 via link 680 and also in communication with hub 625 of East Region 675 via link 690. Further, hub 645 is in communication directly with the spokes of West Region 670 (spoke 605, spoke 610, and spoke 615). Thus, hub 645 in Central Region 665 can communicate with any appliance in West Region 670 via a single hop, whether it be a hub of West Region 670 or a spoke of West Region 670. By building a tunnel (virtual network) directly between a spoke of West Region 670 and hub 645 in Central Region, latency of data traffic is reduced.

Network traffic may traverse between each appliance in a region (intra-region), and/or traverse in an inter-region fashion. For example, an exemplary network path for data flow can be: spoke 605→hub 620→hub 625→spoke 630. Another exemplary network path for data flow can be: spoke 650→hub 645→spoke 615.

III. Regional Routing

To create regional networks as part of a SD-WAN on a virtual overlay network, specialized software is utilized. A proprietary protocol called subnet sharing protocol is utilized to carry routing information and addresses (such as IP addresses) across all sites of the SD-WAN. To configure subnet sharing protocol for a multi-region SD-WAN, every route needs to have its own identity of which region it is coming from, so it can be properly placed in a correct routing table.

The present disclosure is primarily directed to hub and spoke network topologies, or to full-mesh SD-WAN topologies. However, as would be understood by persons of ordinary skill in the art, other network topologies are also within the scope of this disclosure. In a typical scenario, a hub acts as the clearing-house for SD-WAN traffic. Traditionally, a hub advertises a default subnet to each of its spokes. However, with embodiments of the present disclosure, more intelligent routing between hubs can be achieved, and more specificity regarding where each spoke is routed to can be achieved as well. In full-meshed topologies, when a hub is defined, the hub redistributes all learned routes with all peers in the region. Redistribution can also occur between hubs in different regions, but not typically between two hubs in the same region (to prevent routing loops).

In embodiments of the present disclosure, each network appliance has a defined role, and the appliance must know explicitly that it is a hub or a spoke for the region. Spoke appliances only share locally learned subnets (configured, auto, or dynamic). Hubs can redistribute spoke learned routes to other spokes in the same region or to hubs in other regions.

Further, each network appliance explicitly knows in which region it resides. In a defined region, a hub may be configured to communicate with all spokes in the same region via any means (such as a tunnel). While there may be multiple hubs in a region, the hubs in a same region are typically not configured to communicate with one another. That is, while a hub may see all other appliances in its region, it does not share information with another hub in its same region.

With multiple regions, subnet sharing can also be enhanced among network appliances. Embodiments of the present disclosure provide for a network appliance to be configured to support redistribution of appliance learned subnet routes across multiple hub and spoke regions. Subnet sharing is one strategy utilized to auto-optimize IP traffic, automatically directing flows to the appropriate tunnel. Auto-optimization strategies reduce the need to create explicit route map entries to optimize traffic.

With subnet sharing, each appliance builds a subnet table from entries added automatically by the system or manually by a user. When two appliances are connected by a tunnel, they exchange this information ("learn" it) and use it to route traffic to each other.

In exemplary embodiments, subnet sharing takes care of optimizing IP traffic based on the destination IP address alone. A route policy, or a global route policy template can be applied for data traffic flows that are to be sent pass-through (shaped or unshaped), dropped, configured for a specific high-availability deployment, and/or routed based on application, ports, VLAN, DSCP, or ACL (access control list).

The Multi-Region Subnet Sharing (MRSS) leverages enhancements from UserSpace Routing (USR) and extends them across multiple hub and spoke regions established using business intent overlays from a central Orchestrator. For more discussion on business intent overlays, please see co-owned U.S. patent application Ser. No. 16/414,774 entitled "Data Transmission via a Virtual Wide Area Network Overlay", which is hereby incorporated by reference.

In various embodiments, spokes in a region do not redistribute any learned routes, regardless of where that route was learned from. This helps to prevent routing loops in the SD-WAN. However, hubs in a region can redistribute valid MRSS learned routes with all of the spokes in the same region, filtering out a local spoke's routes, to prevent routing loops. A hub can also redistribute its region's routes with a hub in a different region or a spoke in a different region if it has a tunnel to that other hub or other spoke.

In an exemplary use case, there may be fifty appliances forming a virtual network amongst themselves on a WAN side. As discussed herein, all of these appliances also have a LAN side. There is some routing information on the LAN side. Routes that are not specific to the virtual overlay network are not connected to IP addresses of the appliance interfaces, and are located in the LAN network. These routes from the LAN side need to be learned by each network appliance and advertised on the SD-WAN fabric, so that all appliances in the SD-WAN know that a specific application is in a specific data center. Thus, when any appliance in the SD-WAN desires to access that specific application, the appliance knows the routing information to reach the relevant appliance in the data center that is operating that application.

Typical network appliances in communication with one another in a SD-WAN may share subnets with a peer device in a single hop. With embodiments of the present disclosure, if subnet sharing is enabled on a network appliance, then all peer learned subnets from devices outside of the network appliance (automatic, configured, or dynamic) are shared with all connected peers, regardless of how many hops away from the network appliance the peer is located. Thus, the total number of routes that are shareable can be up to 30,000 for a large scale SD-WAN deployment. Subnets are shared as a list of subnets with a subnet message header.

Figure 7:
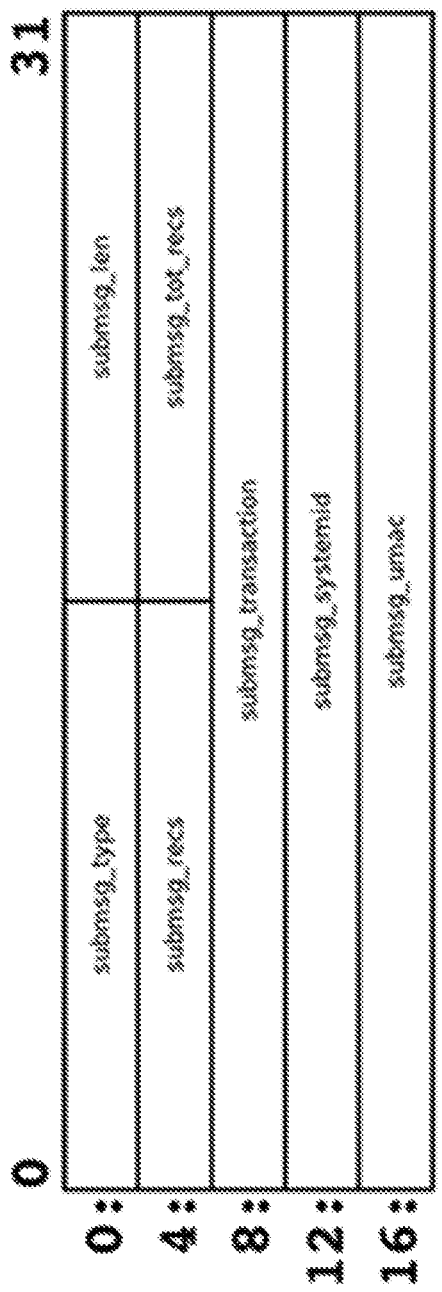
FIGS. 7-9 depict exemplary data packet headers.

In implementing subnet sharing protocol, a control packet is shared between two nodes, where a "node" may be an appliance or other computing device not part of the overlay network. The control packet shared between the nodes exchanges routing information. An example control packet header is depicted in FIG. 7. As would be understood by persons of ordinary skill in the art, there may be fewer or additional fields than those depicted in FIG. 7, in various embodiments. FIG. 7 depicts a message header comprising fields such as a message type, message length, transaction identifier, system identifier, and umac checksum.

Figure 8:
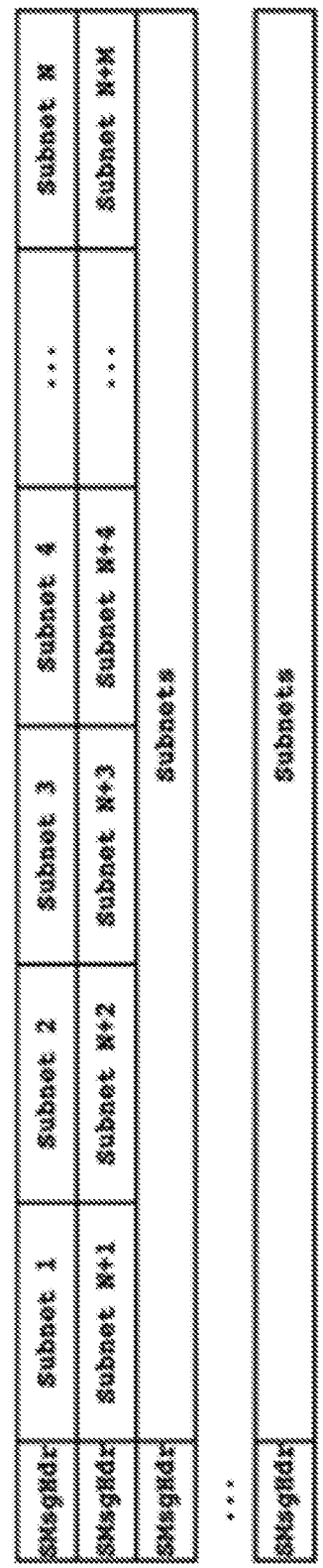

In order to compact and conserve space, as many subnets as possible are placed inside a 1K buffer of the header, as depicted in exemplary FIG. 8. Each of these buffers has a umac checksum to identify corruption at the receiver.

In exemplary embodiments, the subnets have no transaction code—they are always "add". A peer detects deleted subnets by flushing out all associated subnets from the sending peer based on its transaction identifier (stamp). That is, all previously learned subnets from that transmitting peer appliance are deleted from the local subnet table of the receiving appliance and replaced with the newly received subnets. Updates can occur as often as every 20 milliseconds with a refresh occurring after 15 minutes of inactivity. The subnet code may transmit to one peer as frequently as every 20 milliseconds. If a change in the subnet table is detected by a network appliance, the transaction value is updated and an update is sent by the network appliance to each peer. If the receiving peer has an older transaction stamp, it replaces its information from the newly updated subnets. If the receiving peer has a newer transaction stamp, it takes no action based on the received subnet message. In exemplary embodiments, an orchestrator may direct a network appliance to only send subnet update messages to peer appliances with subnets with older transaction stamps.

A route redistributed by a hub typically has its metric increased by a known value. This allows for subnets learned from a non-spoke peer to take precedence over a hub learned route. The particular known value utilized in embodiments of the present disclosure may be a configurable value.

To support MRSS while also supporting older systems and methods of subnet sharing, a unique proprietary message type and messaging format is used by the network appliances. In exemplary embodiments, the new messaging comprises an identifier, region, and role of an appliance along with a message count, total number of records, and a checksum. The message count, total number of records, and checksum aid a remote peer appliance in validating that it received a valid subnet sharing message, and whether it received all routes and all messages that it was sent.

Figure 9:
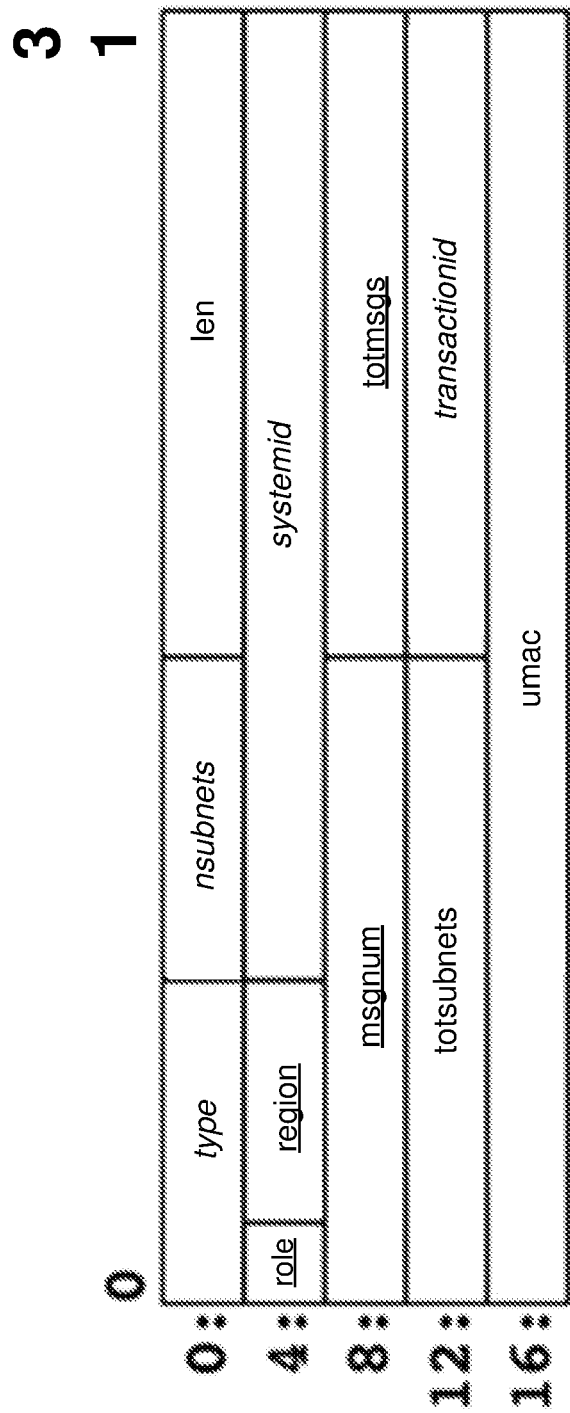

An exemplary message header for the subnet message is depicted in FIG. 9. Modified existing header fields are shown in italicized text, and new header fields are shown in underlined text, for ease of identification. As would be understood by persons of ordinary skill in the art, there may be fewer or additional header fields in various embodiments, than what is depicted in FIG. 9. The exemplary figure depicts a packet header comprising fields such as a number of subnets, a length of data packet, role of a sending appliance, region of a sending appliance, a system identifier, a number of messages in the data flow, a total number of messages, a total number of subnets, a transaction identifier, and an umac checksum.

Region, Hub and Spoke

Hub and spoke topology is one of the most commonly deployed Business Intent Overlays (BIO) in Orchestrator. This decreases the number of tunnels needed in the network, compared to a full mesh topology, since the connectivity is limited only between the hub and spoke. For example, five nodes in a network requires twenty tunnels if in a full mesh configuration, while it only requires eight tunnels in a hub and spoke configuration.

Embodiments of the present disclosure allows for the grouping of the claimed network appliances into regions where, inside that region you can run a full mesh or hub and spoke topology. Connections between regions can be limited to only occur between hubs and there can be multiple hubs per region to support redundancy. Hubs are fully meshed. However, since a hub cannot redistribute any of its own learned routes from peer appliances, customers add a default route at each hub so that the spokes send traffic to the hub. However, a hub cannot know how to reach a spoke in another region and when there are more than two regions involved, the complexity of which hub to send the traffic to increases immensely.

Typically in present systems, a peer cannot redistribute a subnet route to other peers. This causes issues with hub and spoke topologies since the hub cannot inform other hubs about which subnet routes it handles nor can it tell the other spokes connected to it about the subnet routes from a specific spoke.

With Multi-Region Subnet Sharing, these issues can be resolved. This control plane feature will allow the automatic redistribution of routes between hub and spoke and hub to hub which the hubs can use to properly route the tunnel traffic, reducing the complexity of multiple regions. The hub will share the routes it learns from its spokes to the other spokes in its region. However, to avoid creating a routing loop, each spoke will only be given the other spoke's routes, the hub will not reflect its own routes back to the spoke. As discussed herein, hubs can also share the routes learned from its spokes with hubs in other regions, but not with hubs inside its own region. A hub can share the routes it learns from other hubs with its spokes but cannot share with other hubs. Spokes do not redistribute any internal learned routes.

To support this functionality, an orchestrator configures each appliance such that: a hub must be connected to all spokes in its region; within a region, all appliances know which region they belong to; and all appliances know their role (either a hub or a spoke, with spoke being the default).

If a region is using full mesh topology, instead of hub and spoke, then all appliances (sometimes referred to herein as nodes) are considered spokes in the region.

When a route is redistributed (hub to spoke or hub to hub) a cost will be assigned so that the remote end can make a choice when it has multiple route paths. This may be accomplished by simply increasing the routing metric by a known amount for a particular route.

When a route is advertised, a cost of the route is increased because a number of hops is increased. This is due to the fact that embodiments of the present disclosure create a hub-based, second hierarchical topology between hubs. Instead of going from a first appliance to a second appliance directly, the data traffic travels from the first appliance to a first hub, then to a second hub, and then to the second appliance (assuming the two appliances are in different regions). If a cost of going from the first appliance to the second appliance directly is attributed a value of 50, then the cost is increased to 150 when the traffic travels through the two intermediate hubs.

In exemplary embodiments, if a same route is received by an appliance from two different peers, the cost value is evaluated to see which is the cheapest (and thus likely the fastest) route. Further, this allows for subnets learned from a spoke peer to take precedence over a hub learned route. That is, a direct route from a spoke is likely to be a better (lower cost, faster) route than a route through a hub.

If a same route is learned by an appliance from multiple hubs, the shortest path is likely to be the chosen path. Because each hub increments a routing metric by a known value before sharing, a lower metric is likely to be the shorter (and hence faster) path, and is likely to be the one chosen by an appliance. The specific value amount for the routing metric is relative—the metric is mainly used to differentiate between various routes.

Route Types

Different policies can be applied to routes, based on how an appliance learns of the route. For example, a "locally learned route" is a route learned on an appliance by any one of the following means: auto route, static route, and dynamic route. An "auto route" is a route added to a local subnet table on the appliance automatically. For example, locally connected subnets are added for each datapath interface. As discussed herein, each appliance has a LAN side network and interfaces configured on the LAN side. Subnets and IP addresses assigned to a LAN interface of an appliance are "auto" routes of a "locally learned route".

A "static route" is a route that is manually added via configuration by an orchestrator or administrative user, and is stored in a local configuration database of an appliance. A "dynamic route" is a route that is learned via a known routing protocol, such as BGP or OSPF. An "enterprise learned route" is a learned route learned via subnet sharing. An "enterprise spoke learned route" is a route learned from a spoke at its hub. An "enterprise hub learned route" is a route learned from a hub.

Subnet Table

In exemplary embodiments, each appliance has a subnet table, either stored locally on a hard drive, or stored in a centrally accessible networked location. If the option is selected, an appliance can automatically include local subnets when it shares its subnet information with other appliances. For example, the local subnet(s) for the appliance's interfaces can be added to the subnet table. A local subnet is one that includes one of the appliance IP addresses. If the option is deselected, the system doesn't create entries in its subnet table for the appliance's local subnets. If these subnets are not listed in the subnet table, they cannot be shared with peer appliances for auto-optimization.

An exemplary subnet table at an appliance may comprise a number of fields. For example, a subnet table may have a field for "subnet/mask", which specifies the actual subnet to be shared/advertised so it can be learned by a peer appliance.

A subnet table may also have a "metric", similar to the routing metric discussed herein. In exemplary embodiments, the metric may be a value between 0 and 100 and indicates the priority of a given subnet. A default priority may be 50. When an appliance finds that more than one peer appliance is advertising the longest matching subnet, it chooses the peer that advertises the subnet with the lowest metric value, as the lower metrics have priority. As would be understood by persons of ordinary skill in the art, the metric may be expressed in a different format, such as any alphanumerical value, with priority denoted in different ways.

A subnet table may also have a field to denote whether the listed subnet is local to the site. When a subnet is not local, a manually added subnet in the table is unavailable for auto-optimization in exemplary embodiments.

The subnet table may further have a field for denoting whether or not the subnet is to be advertised to peers. When selected, the subnet information is shared with peers. When deselected, a subnet in the table is not divulged to peers.

The subnet table may further have a field for denoting the type of subnet. An auto subnet is automatically added to the subnet table by the system, and comprises subnets of interfaces on the appliance. A subnet may also be manually added or configured for the appliance by a user. Further, a subnet may be learned from a peer, and added to the subnet table as a result of exchanging information with peer appliances. If learned from a peer appliance, the subnet table identifies the peer appliance that advertised the subnet information.

Subnet Sharing Versioning

As discussed herein, a proprietary subnet messaging type is utilized to implement the MRSS scheme disclosed. Prior to the use of the new subnet messaging type, an appliance determined the lowest common subnet version between itself and its peers. Thus, even if the appliance could support the latest subnet sharing feature, if any of its peers was configured as a lower (older) subnet version, then the lower subnet version is shared with all of its peers.

With MRSS, the subnet sharing version is determined on a peer to peer basis. This allows the appliance to share subnets using the newer (higher) version features even when some of its spokes are still using an older subnet version. However, any routes learned from a peer using an older subnet version are not redistributed. Peers can still advertise their subnet sharing version via the keepalive message.

Beginning Subnet Sharing

Figure 10:
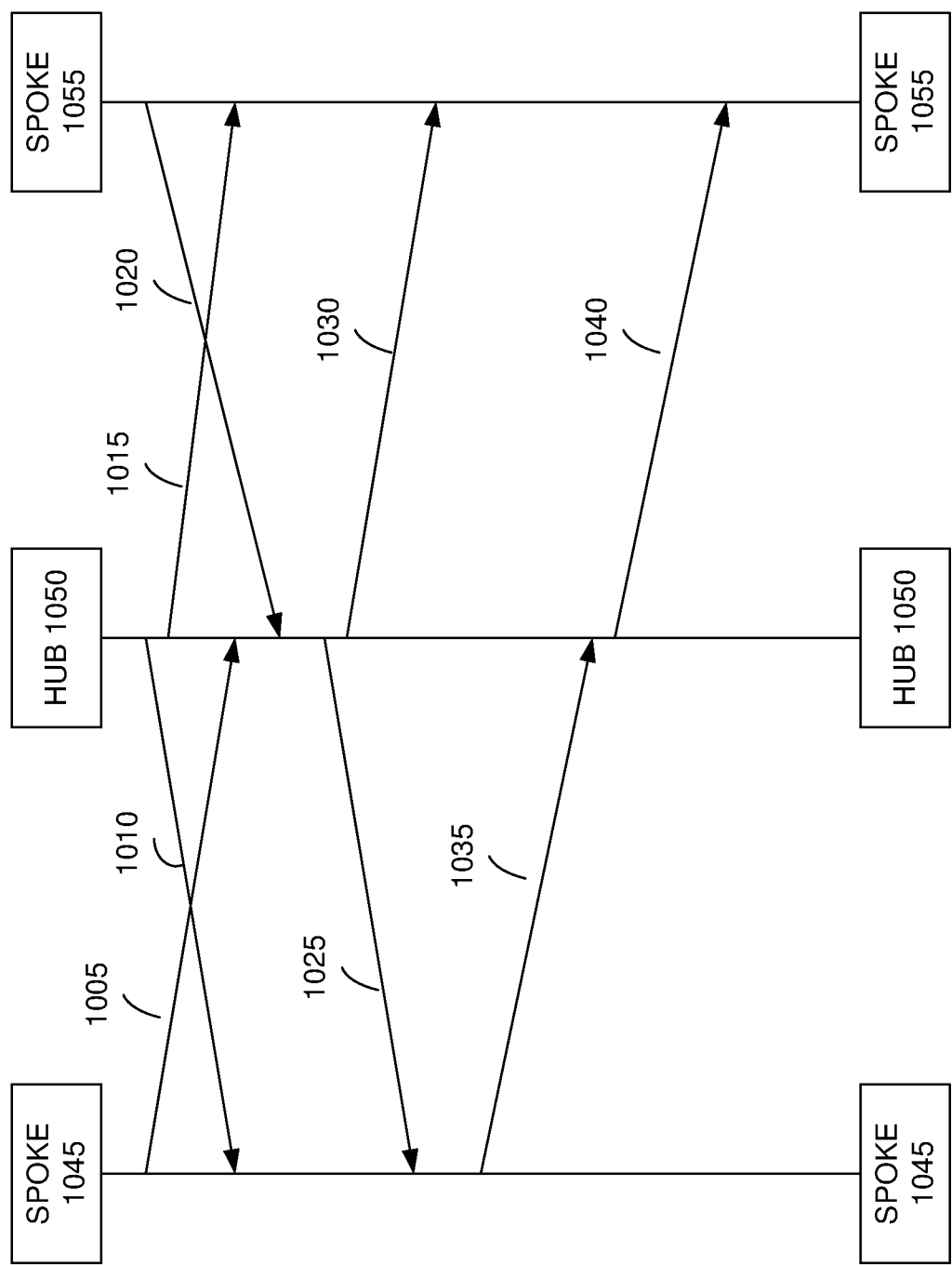
FIG. 10 depicts an exemplary message sequence chart for two spokes and a hub sharing subnets within a single region.

FIG. 10 depicts an exemplary message sequence chart for two spokes and a hub sharing subnets within a single region. In the exemplary embodiment of FIG. 10, a packet flow occurs after tunnels are established between each spoke and hub.

In message 1005, spoke 1045 shares its locally learned routes with hub 1050. Hub 1050 records in its internal memory that spoke 1045 is configured as a spoke for the regional network topology. Hub 1050 then shares its locally learned routes with spoke 1045 in message 1010, and spoke 1045 records in its internal memory that hub 1050 is configured as a hub for the network topology.

A task cycle later, hub 1050 shares its locally learned routes with spoke 1055 in message 1015, and also records in its internal memory that spoke 1055 is configured as a spoke for the network topology. Spoke 1055 shares its locally learned routes with hub 1050 in message 1020.

In message 1025, hub 1050 shares the routes learned from spoke 1055 with spoke 1045. In message 1030, hub 1050 shares the routes learned from spoke 1045 with spoke 1055. In message 1035, spoke 1045 sends a new set of routes to hub 1050. Hub 1050 then shares these routes from spoke 1045 with spoke 1055 in message 1040.

In this manner, routes are shared between the hub and spokes within a single region. Notably, in this embodiment, spoke 1045 and spoke 1055 only exchange routes through hub 1050. That is, they are not directly sharing routes with one another.

In exemplary embodiments, when an appliance receives a routing update, it transmits this update to all connected peer appliances in a round robin fashion. If there is no change in routing information, then the appliance does not need to send a control packet with routing information to the other connected peer appliances. A routing update comprising a change in a route may be caused by a user adding a new route, a new route is learned from a hub or another peer appliance, or a new route is learned from an external source, such as BGP or OSPF protocol.

Subnet Sharing Update

Figure 11:
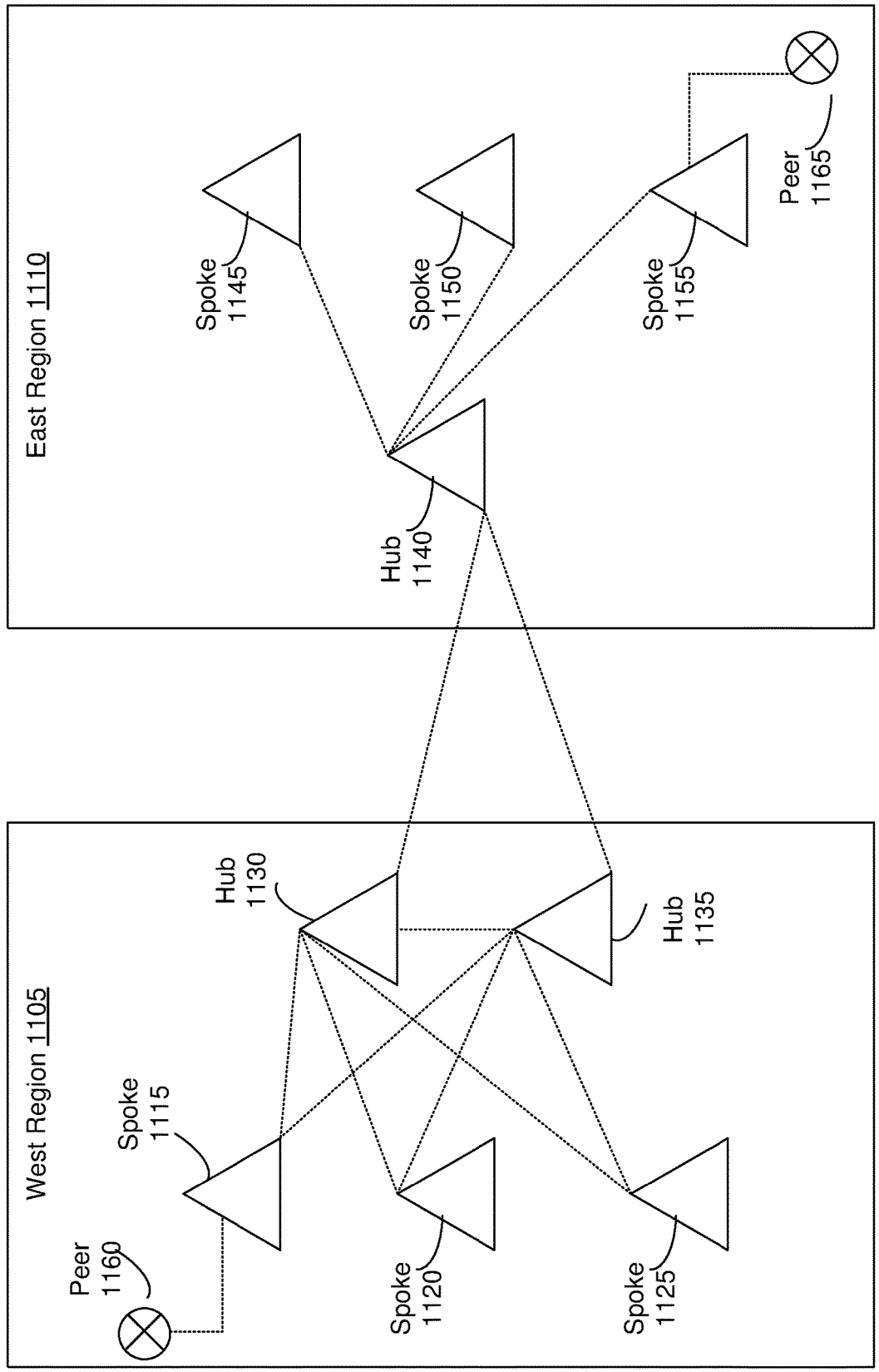
FIG. 11 depicts an exemplary embodiment of a subnet sharing update among appliances.

FIG. 11 shows an exemplary embodiment of a subnet sharing update among appliances. In the example topology of FIG. 11, West Region 1105 is configured as having three spokes (spoke 1115, 1120, and 1125) and two hubs (hub 1130 and 1135). East Region 1110 is configured as having one hub (hub 1140) and three spokes (spokes 1145, 1150, and 1155). Further, spoke 1115 of West Region 1105 is depicted as being in communication with peer 1160. In various embodiments, peer 1160 may be a router, switch, user device, or any computing device not part of the overlay network comprised of the peer appliances. Spoke 1155 of East Region 1110 is also depicted as being in communication with peer 1165. In various embodiments, peer 1165 may be the same type of peer or different type of peer than peer 1160. Peer 1165 may be a router, switch, user device, or any computing device not part of the overlay network comprised of the peer appliances.

As discussed herein, each hub of each region is configured to be in communication with each of the spokes within its own region. Further, the hubs of each region are configured to be in communication with one another. That is, hubs 1130 and 1135 of West Region 1105 may be in communication with one another, as well as in communication with hub 1140 of East Region 1110.

In an exemplary embodiment, spoke 1115 receives an update from its BGP peer, peer 1160. Upon reception of this BGP update, a subnet table at spoke 1115 is updated and the new routes as marked as BGP learned routes. Since its local subnet table has been updated, spoke 1115 sends a subnet sharing update message to both hubs in its region, hub 1130 and hub 1135.

Upon reception of the subnet update message from 1115, each of hubs 1130 and 1135 update their own local subnet tables. The newly learned routes are marked as "spoke learned", and each hub updates its connected spokes. That is, hub 1130 sends a subnet update message to spoke 1120 and spoke 1125. Hub 1135 also sends a subnet update message to spokes 1120 and 1125. Since the subnet update was received from spoke 1115, there is no need for either hub to send the same subnet update back to that spoke.

In this manner, the spokes of West Region 1105 are updated with the BGP routing update from spoke 1115. Further, the subnets have their metric updated by a known amount from the hub. Upon receipt, these routes are marked by spokes 1120 and 1125 as "hub learned" and thus cannot be shared to any other appliance.

It is also noted that subnet updates arrive from both hub 1130 and hub 1135 at spokes 1120 and 1125 as equal cost subnets. In exemplary embodiments, equal cost subnets have a same routing metric value. The routing metric value is influenced by a number of hops and/or user-configured rules, as discussed herein. Each spoke then uses peer priority to choose a preferred hub.

A particular destination may be learned by an appliance from multiple peers in a network, providing the appliance with multiple paths to reach the destination. In order to select the best path to utilize to reach the destination, peer priority is used. In exemplary embodiments, peer priority is based on user configured rules. In an example embodiment, the USA may be one region within a SD-WAN. The region may have an East Coast hub and a West Coast hub. An appliance in California may choose the West Coast hub as a higher priority and the East Coast hub as a lower priority, due to geographical distance. In various embodiments, peer priority is defined by each appliance, and each appliance has a preferred hub priority.

Each of hub 1130 and hub 1135 of West Region 1105 also send the subnet update to the East Region 1110, via hub 1140. When East Region 1110 hub 1140 receives the updates, the routes are marked as "hub learned". Since the receiving peer appliance is a hub, it can redistribute these routes only to its spokes and to no other peer. It is also noted that hub 1140 receives the same routes from both hub 1130 and hub 1135 as equal cost. For routing purposes, hub 1140 may use peer priority to select the preferred West Region 1105 hub to receive traffic.

Hub 1140 also sends the subnet update to each of its regional connected spokes, spokes 1145, 1150, and 1155. Each spoke updates its own local subnet table. Further, since spoke 1155 is also in communication with peer 1165, and the received subnet update contains BGP learned routes, spoke 1155 sends an update to its BGP peer, peer 1165.

Sharing with Non-Region Spokes

In additional embodiments, a hub can share all of the routes it learned in its local region with a spoke in another region. The orchestrator can identify non-region hubs that a spoke can establish a tunnel with. This allows a method of providing a faster path to critical spoke appliances in another region.

Figure 12:
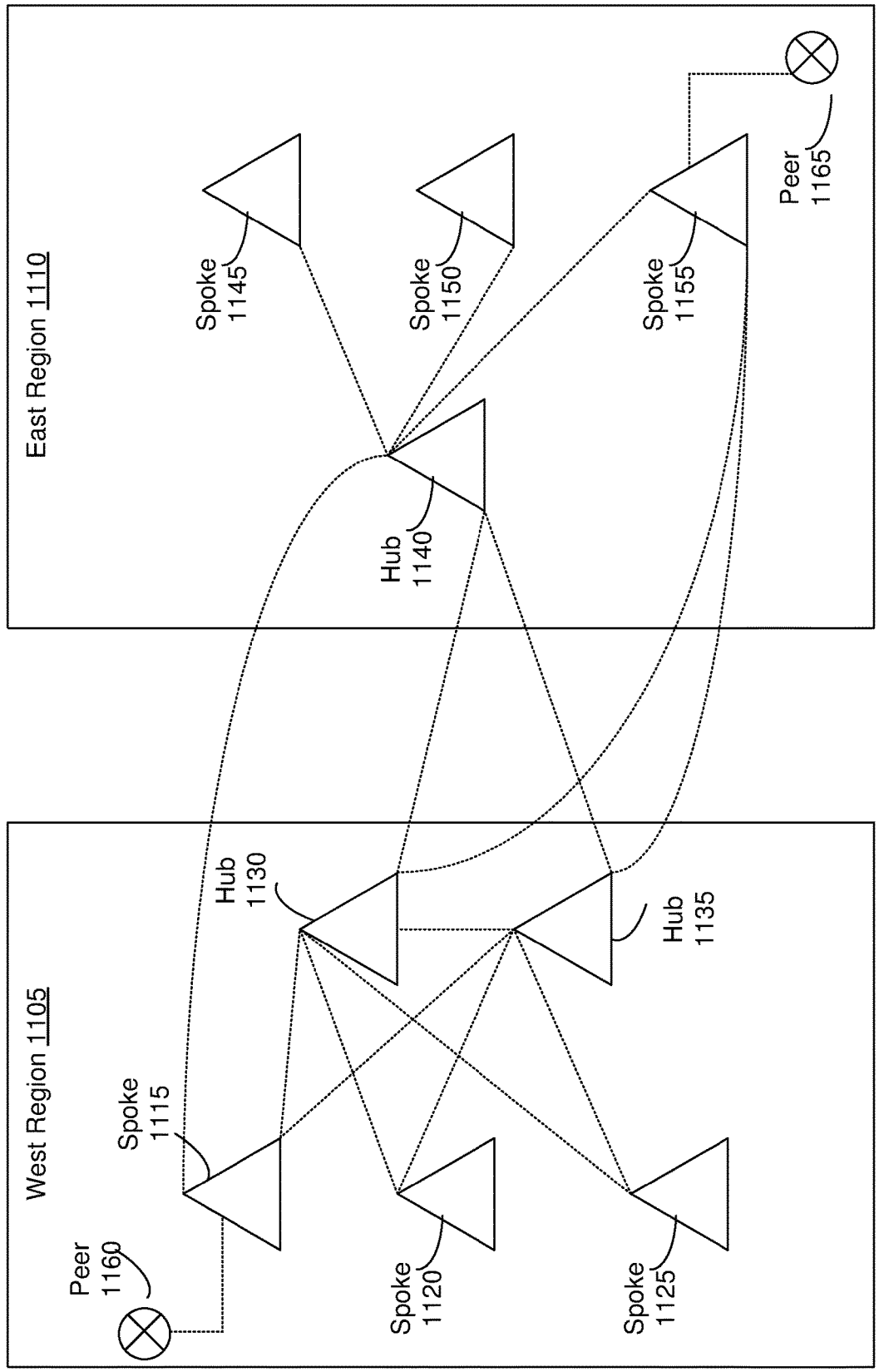
FIG. 12 depicts an exemplary embodiment of subnet sharing between hubs and non-region spokes.

FIG. 12 depicts an exemplary embodiment of subnet sharing between hubs and non-region spokes. In the exemplary figure, spoke 1115 of West Region 1105 has a tunnel to hub 1140 in the East Region 1110. Further, spoke 1155 of East Region 1110 has a tunnel to both hub 1130 and hub 1135 of West Region 1105.

In exemplary embodiments, the hubs only share regional routes with those spokes, and not any routes learned from another hub. For example, hub 1140 can share routes learned from spoke 1145, spoke 1150, and spoke 1155 with spoke 1115 of West Region 1105. It is noted that spoke 1115 will also learn those same routes via its own hubs, hub 1130 and hub 1135. But the same routes learned from its own hubs will have a larger metric (due to the extra hop), causing spoke 1115 to route directly to hub 1140 instead of going through its local region hubs.

IV. Orchestrator Configuration

As discussed herein, the Orchestrator is configured to create the virtual overlay network, create tunnels between appliances in the virtual overlay network, configure each appliance in the virtual overlay network, and many more functions.

When creating regions within the SD-WAN, the orchestrator ensures that all hubs are connected to all spokes within a region. The orchestrator also informs each appliance which region it is a part of. In exemplary embodiments, the region contains a scalar. "Regions" as discussed herein may be delineated on any user-configured basis. That is, an enterprise may create a region for a geographical boundary, such as a continent, a country, a state, or any other desired boundary. In other embodiments, regions may be created based on business objectives for an enterprise. In further embodiments, regions may be created based on a desired division of appliances. As would be understood by persons of ordinary skill in the art, regions can be created based on any criteria. Further, virtual appliances may be configured to be in any region based on any criteria desired by the enterprise. Regional distribution of appliances may also be dynamic, such that an enterprise may reassign appliances from one region to another region, as desired.

The orchestrator is further tasked with informing each appliance of its role. If there are any conflicts and an appliance is listed in one BIO as a hub but in another BIO as a spoke, its role is a hub.

Figure 13:
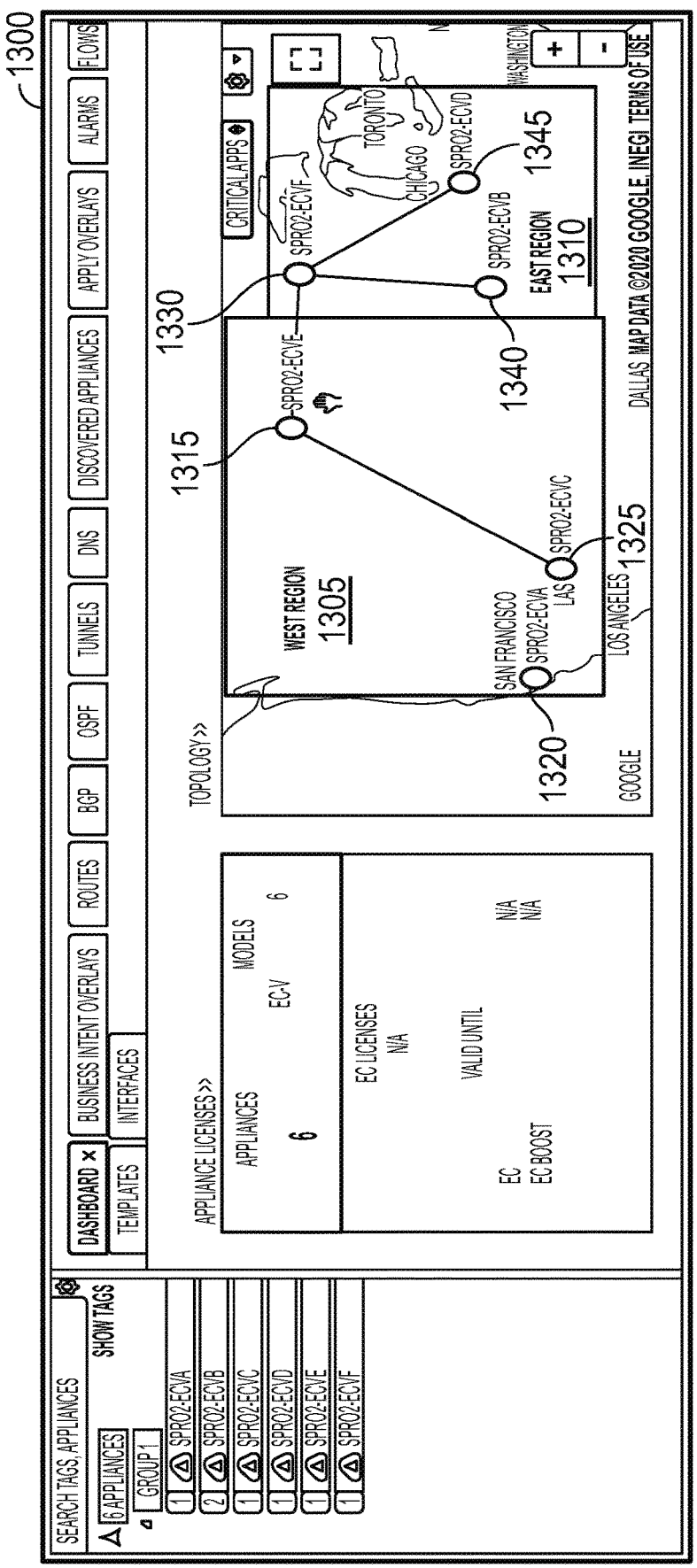

FIG. 13 depicts an exemplary user interface 1300 that a network administrator may view from an orchestrator, such as orchestrator 310 of FIG. 3. In the exemplary FIG. 13, six appliances are depicted as dots, with three appliances located in West Region 1305 and three appliances located in East Region 1310. In an exemplary embodiment, both West Region 1305 and East Region 1310 are each configured with hub and spoke topology. Appliance 1315 of West Region 1305 is configured as a hub for the region, and appliances 1320 and 1325 are configured as spokes for the region. Appliance 1320 is not operational, so hub 1315 is only depicted as being in communication with spoke 1325 within its own region. Further, hub 1315 of West Region 1305 is depicted as being in communication with hub 1330 of East Region 1310. Further, hub 1330 of East Region 1310 is in communication with each of spokes 1340 and 1345 within its region.

In exemplary embodiments, a network administrator can designate a network topology to be applied to each region, and this can be changed dynamically. For example, a network administrator may decide to re-configure a region with hub and spoke topology to have a full mesh topology instead. Through a user interface on the orchestrator, the network administrator can direct to change East Region 1310 to be in a full mesh configuration. The orchestrator would then communicate with each appliance within East Region 1310 and remotely and dynamically reconfigure each appliance to operate according to a full mesh network. The orchestrator can also create tunnels between appliances substantially instantaneously to facilitate communications over the SD-WAN, if the tunnels do not already exist.

Figure 14:
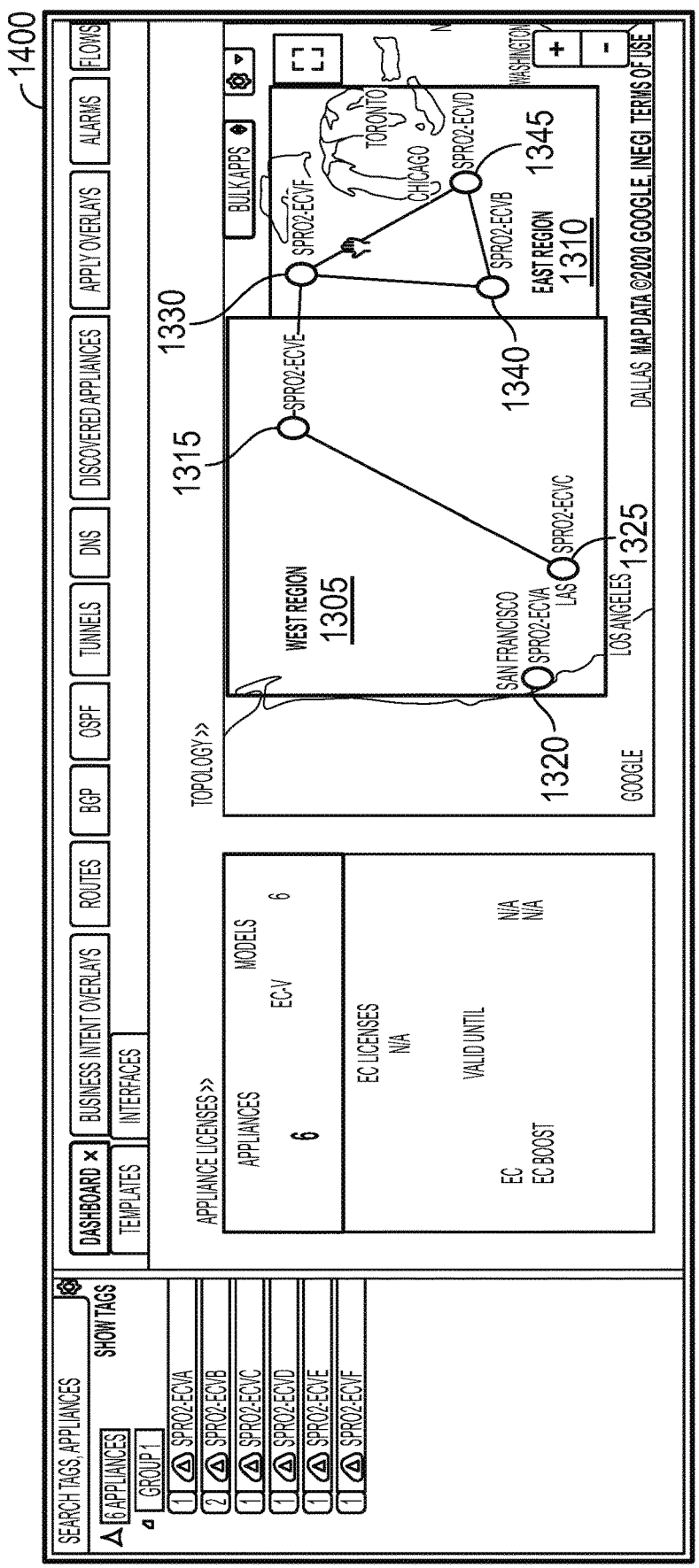

FIG. 14 depicts another exemplary user interface 1400 that a network administrator may view from an orchestrator, with the same appliances described in connection with FIG. 13. In the exemplary FIG. 14, West Region 1305 is configured with hub and spoke topology, and East Region 1310 is configured as a full mesh network. Appliance 1315 of West Region 1305 is configured as a hub for West Region 1305, and appliances 1320 and 1325 are configured as spokes for the region. Further, hub 1315 of West Region 1305 is depicted as being in communication with hub 1330 of East Region 1310. East region 1310 is configured as a full mesh, so each of hub 1330 and spokes 1340 and 1345 within East Region 1310 are all in communication with one another.

Figure 15:
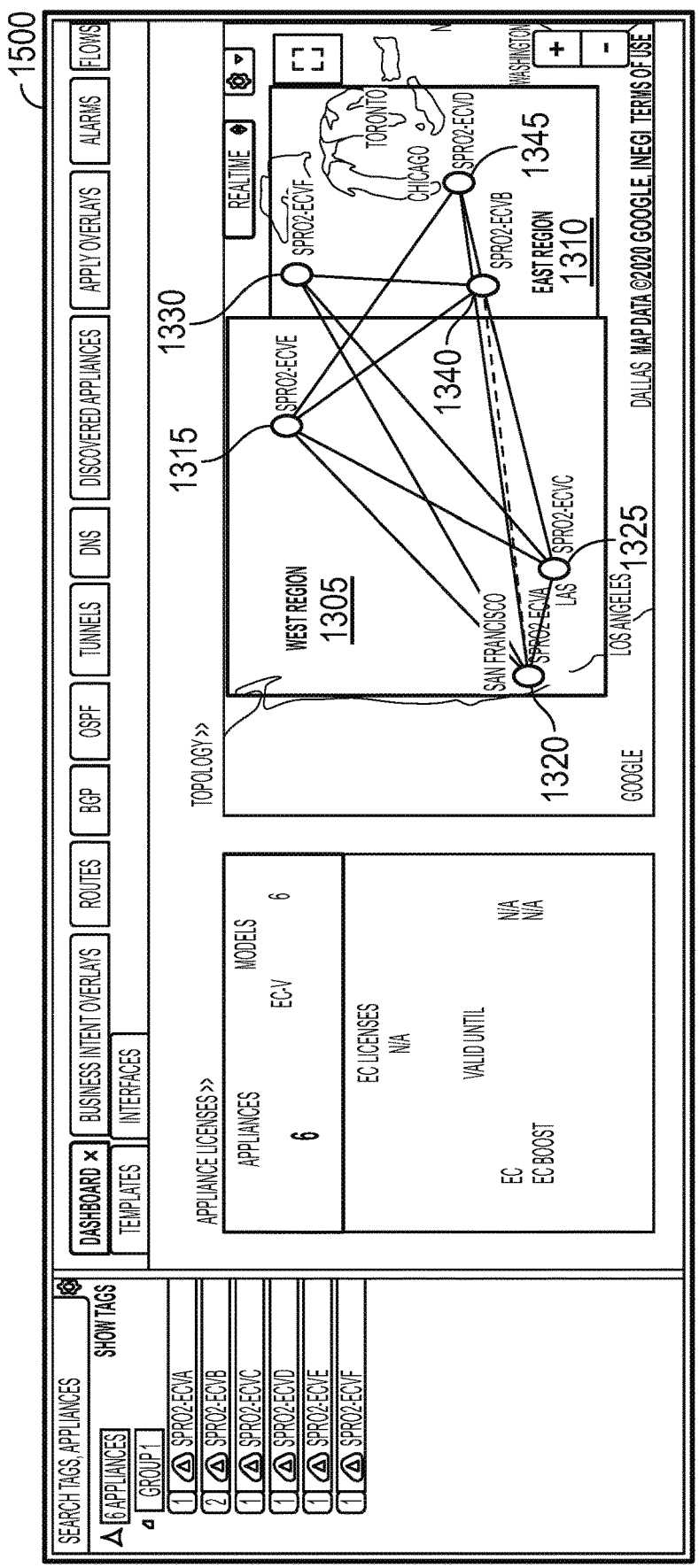

FIG. 15 depicts another exemplary user interface 1500 that a network administrator may view from an orchestrator, with the same appliances described in connection with FIG. 13. In the exemplary FIG. 15, West Region 1305 and East Region 1310 are configured in a full mesh topology, both within each region, and also across the regions. That is, all appliances within West Region 1305 are in full mesh with one another, all appliances within East Region 1310 are in a full mesh with one another, and all six appliances across both regions are in a full mesh with one another. In a full mesh topology, each appliance is configured by the orchestrator as having the role of a spoke.

Figure 16:
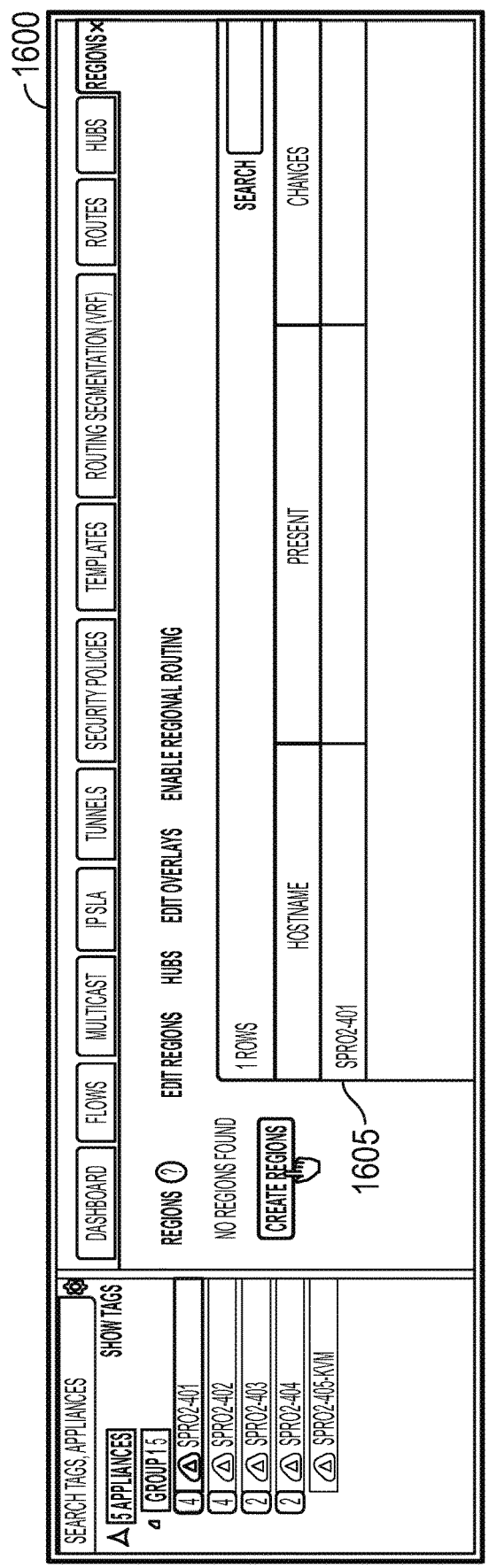

As discussed herein, an orchestrator for an enterprise SD-WAN can create and manage all of the regions that may be present in the enterprise SD-WAN. FIG. 16 depicts an exemplary user interface 1600 that a network administrator may view from an orchestrator, such as orchestrator 310 of FIG. 3. In the exemplary FIG. 16, an appliance identifier is depicted in field 1605. Further, the user interface 1600 shows that there are "No regions found" as encompassing the appliance identified in field 1605. An administrator can select a button on the interface to "Create Regions" to create one or more regions for the SD-WAN substantially instantaneously.

FIG. 17 depicts an exemplary user interface 1700 that a network administrator may view from an orchestrator, such as orchestrator 310 of FIG. 3, to assign or re-assign an appliance to a region. In the exemplary interface, two regions are depicted—an East Region and a West Region. Six appliances are depicted under the "Hostname" column, and the region each appliance is currently assigned to is shown in the "Present" column. An administrator can select an appliance from the list and either "add" or "remove" it to the East Region or the West Region through the selectable objects. Further, when an appliance is reassigned to a different region, it may be shown in the "Changes" column of user interface 1700. In this way, an administrator can seamlessly assign or reassign appliances to existing regions. The orchestrator automatically configures each appliance accordingly, and creates the corresponding communication tunnels.

In one example, when an appliance is reassigned from a first region to a second region, the orchestrator sends an update message to the appliance informing it of its new region assignment, and also updates a role for the appliance within its new region, as applicable. That is, the appliance may change from a "hub" role to a "spoke" or vice versa.

Thus, methods and systems for a multi-region Software-Defined Wide Area Network are disclosed. Because an SD-WAN of the present disclosure is comprised of multiple regions, there are different network administrators in each region who have administrative authority of their regional subnetwork. A local network administrator of one region in the SD-WAN may not have control, or even access, to appliances in other regions of the SD-WAN.

In addition, a network administrator for the entire (global) enterprise SD-WAN can configure certain aspects of the network based on business goals, which cannot be changed by local regional administrators. The virtual overlay networks are created at a global level. At a local level, administrators may modify specific regional appliances, add rules, etc.

Further, with embodiments of the present disclosure, applications can be processed differently in different regions. For example, one application may use MPLS links to send application traffic in one region, but a different link (such as LTE, public Internet, etc.) to send traffic from the same application in a different region, such as if MPLS is available. Each region may use a different cloud security service, based on availability and cost of the service. Security and networking policies may be configured on a regional basis.

Although embodiments have been described with reference to specific examples, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A method for creating a multi-region virtual overlay network, the method comprising:
   determining, by a first network appliance, that the first network appliance is assigned to a first regional subnetwork within a virtual overlay wide area network, the first network appliance having a first role within the first regional subnetwork;
   generating a message header for a subnet message, wherein the message header comprises an identifier associated with the first network appliance, an identifier associated with the first regional subnetwork, and the first role of the first network appliance, and wherein the message header is associated with at least one routing information; and
   sending the message header to a second network appliance in a second regional subnetwork within the virtual overlay wide area network, wherein a list of subnets maintained by the second network appliance is updated based on the message header and the routing information.

2. The method of claim 1, wherein the first network appliance maintains a first subnet table;
   wherein the method further comprises:
   determining that an option to include one or more local subnets of the first subnet table is selected; and
   including the one or more local subnets of the first subnet table in the message header.

3. The method of claim 2, wherein the message header triggers an update to a second subnet table maintained at the second network appliance, and wherein the first role is associated with routing information in the second subnet table.

4. The method of claim 2, wherein the first subnet table includes a first metric indicative of a priority associated with a first subnet.

5. The method of claim 4, wherein a second message header is received by the second network appliance from a third network appliance, wherein the second message header includes a second metric associated with a second subnet, and wherein at least one subnet is selected over the second subnet based on a comparison between the first metric and the second metric.

6. The method of claim 1, further comprising:
   determining that a first piece of routing information is associated with a first version;
   determining that a second piece of routing information is associated with a second version;
   comparing the first version and the second version; and
   based on the comparison, selecting the first piece of routing information for inclusion into the message header.

7. The method of claim 1, wherein the first role indicates a hub in a first hub-and-spoke network topology associated with the first regional subnetwork, wherein the first hub-and-spoke network topology includes at least a first and a second spokes, and wherein the method further comprises:
including routing information from the first spoke in the message header; and
sending the message header to the second spoke.

8. The method of claim 7, wherein the first and second spokes exchange routing information through the first network appliance.

9. The method of claim 7, further comprising:
marking the routing information as learned from a spoke.

10. The method of claim 1, wherein a second role associated with the second network appliance indicates a hub in a hub-and-spoke network topology associated with the second regional subnetwork, wherein the hub-and-spoke network topology includes a spoke, and wherein the message header is transmitted to the spoke by the second network appliance based on a determination that the second network appliance is a hub.

11. The method of claim 1, wherein the first role indicates a hub in a first hub-and-spoke network topology associated with the first regional subnetwork; and wherein the method further comprises:
determining that a tunnel couples the first network appliance and the second network appliance; and
sending the message header to the second network device via the tunnel.

12. The method of claim 1, further comprising:
categorizing a first piece of routing information as a route learned via subnet sharing; and
categorizing a second piece routing information as a route learned locally by the first network appliance.

13. The method of claim 1, wherein the first role indicates a spoke in a first hub-and-spoke network topology associated with the first regional subnetwork, wherein a second role associated with the second network appliance is indicates a hub in a second hub-and-spoke network topology associated with the second regional subnetwork, wherein routing information provided by at least one spoke in the second hub-and-spoke network to the second network appliance is transmitted by the second network appliance to the first network appliance, and wherein routing information provided to the second network appliance from a hub is not received by the first network appliance.

14. The method of claim 13, wherein the routing information provided by the at least one spoke of the second hub-and-spoke network is associated with a metric;

wherein the method further comprises:
selecting, based on the metric, the routing information provided by the second network appliance over routing information provided by a hub of the first hub-and-spoke network topology.

15. The method of claim 1, wherein the first regional subnetwork is configured in a full mesh topology; and
wherein all network appliances, including the first network appliance, in the first regional subnetwork are configured as spokes.

16. The method of claim 1, wherein the first role indicates a hub in a first hub-and-spoke network topology associated with the first regional subnetwork, wherein the first hub-and-spoke network topology includes a third network appliance, wherein the second regional subnetwork includes a fourth network appliance, wherein the third network appliance receives routing information from a peer that is not part of the virtual overlay wide area network, wherein the routing information is provided to the fourth network appliance through the first network appliance and the second network appliance.

17. A system operating as a first network appliance in a multi-region virtual overlay network for a software-defined wide area network, the system comprising:
at least one processor; and
a memory storing instructions that, when executed by the at least one processor, cause the system to perform a method, the method comprising:
maintaining a local subnet table that includes a first set of subnet information learned from packets received from a second network appliance, wherein the first set of subnet information is associated with a first transaction identifier;
receiving a second set of subnet information from the second network appliance, wherein the second set of subnet information is included in a packet with a message header comprising an identifier of the second network appliance, an identifier associated with a regional subnetwork of the second network appliance, a role of the second network appliance, and a second transaction identifier; and
based on the second transaction identifier, replacing the first set of subnet information in the local subnet table with the second set of subnet information.

18. The system of claim 17, wherein the method further comprises:
updating the first transaction identifier with the second transaction identifier.

19. The system of claim 17, wherein the first network appliance operates as a hub in a hub-and-spoke topology; and
wherein the method further comprises:
distributing the second set of information to one or more spokes in the hub-and-spoke topology.

20. The system of claim 19, wherein a metric associated with a distributed route is increased, and wherein subnet information learned from a non-spoke peer of the hub-and-spoke topology takes precedence over the distributed route based on the metric.

21. A non-transitory computer-readable storage medium including instructions that, when executed by at least one processor of a computing system, cause the computing system to perform a method for creating a multi-region virtual overlay network for a software-defined wide area network, the method comprising:
receiving a message header of a subnet message, wherein the message header comprises an identifier associated with a first network appliance, an identifier associated with a first regional subnetwork, and a role of the first network appliance, wherein the message header is associated with a packet comprising at least one piece of routing information;
determining whether to send the piece of routing information to at least one spoke in a hub-and-spoke topology associated with a second regional subnetwork based on the role of the first network appliance; and
based on the determination, sending the routing information to the at least one spoke in the hub-and-spoke topology associated with the second regional subnetwork.

* * * * *